United States Patent
Yamagami

(10) Patent No.: US 8,931,945 B2
(45) Date of Patent: Jan. 13, 2015

(54) LIGHTING APPARATUS

(75) Inventor: Shinji Yamagami, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/639,413

(22) PCT Filed: Mar. 15, 2011

(86) PCT No.: PCT/JP2011/056054
§ 371 (c)(1),
(2), (4) Date: Oct. 4, 2012

(87) PCT Pub. No.: WO2011/129170
PCT Pub. Date: Oct. 20, 2011

(65) Prior Publication Data
US 2013/0021823 A1    Jan. 24, 2013

(30) Foreign Application Priority Data

Apr. 13, 2010 (JP) ................... 2010-092538

(51) Int. Cl.
| | |
|---|---|
| *F21S 8/06* | (2006.01) |
| *F21V 7/00* | (2006.01) |
| *F21V 7/05* | (2006.01) |
| *F21V 13/04* | (2006.01) |
| *F21V 8/00* | (2006.01) |
| *F21V 5/04* | (2006.01) |
| *F21V 15/01* | (2006.01) |
| *F21Y 101/02* | (2006.01) |

(Continued)

(52) U.S. Cl.
CPC .............. *F21S 8/06* (2013.01); *F21V 7/0033* (2013.01); *F21V 7/05* (2013.01); *F21V 13/04* (2013.01); *G02B 6/0021* (2013.01); *F21V 5/04* (2013.01); *F21V 7/0008* (2013.01); *F21V 7/0091* (2013.01); *F21V 15/011* (2013.01); *F21Y 2101/02* (2013.01); *F21Y 2103/022* (2013.01); *F21Y 2113/005* (2013.01); *G02B 6/0046* (2013.01)
USPC ..................... 362/628; 362/613; 362/602

(58) Field of Classification Search
USPC ................... 362/602, 612, 613, 628
See application file for complete search history.

(56) References Cited

U.S. PATENT DOCUMENTS 5,101,325 A * 3/1992 Davenport et al. .......... 362/628
6,217,185 B1 * 4/2001 Feger et al. .................. 362/628
(Continued)

FOREIGN PATENT DOCUMENTS

JP 2004-253238 A 9/2004
JP 2007-311327 A 11/2007
(Continued)

OTHER PUBLICATIONS

International Search Report issued in PCT/JP2011/056054, mailed on Apr. 19, 2011.

*Primary Examiner* — Laura Tso
(74) *Attorney, Agent, or Firm* — Birch, Stewart, Kolasch & Birch, LLP

(57) ABSTRACT

A lighting apparatus is held by a chassis and includes a plurality of LED modules emitting light toward an outer edge portion of the chassis and a light guiding plate for controlling the direction of light emission from the plurality of LED modules to perform illumination. The LED module is not arranged at the outer edge portion of the chassis so that moment acting on the chassis as the apparatus main body holding the LED module can be reduced as compared with the case where the LED module is arranged at the outer edge portion of the chassis. Therefore, the deformation such as bending of the chassis can be prevented.

6 Claims, 39 Drawing Sheets

(51) Int. Cl.
*F21Y 103/02* (2006.01)
*F21Y 113/00* (2006.01)

(56) References Cited

U.S. PATENT DOCUMENTS

| | | | |
|---|---|---|---|
| 8,109,666 B2 * | 2/2012 | Sawada et al. | 362/628 |
| 2007/0247870 A1 | 10/2007 | Sakai et al. | |
| 2009/0129121 A1 * | 5/2009 | Yoneda | 362/628 |
| 2010/0128496 A1 * | 5/2010 | Chang | 362/628 |
| 2011/0176330 A1 * | 7/2011 | Wu et al. | 362/612 |

FOREIGN PATENT DOCUMENTS

| | | |
|---|---|---|
| JP | 2007-317360 A | 12/2007 |
| JP | 2008-300203 A | 12/2008 |
| JP | 2009-81335 A | 4/2009 |
| JP | 2009-187718 A | 8/2009 |
| JP | 2009-289709 A | 12/2009 |
| WO | WO 2008/047278 A2 | 4/2008 |
| WO | WO 2008/126011 A1 | 10/2008 |

\* cited by examiner

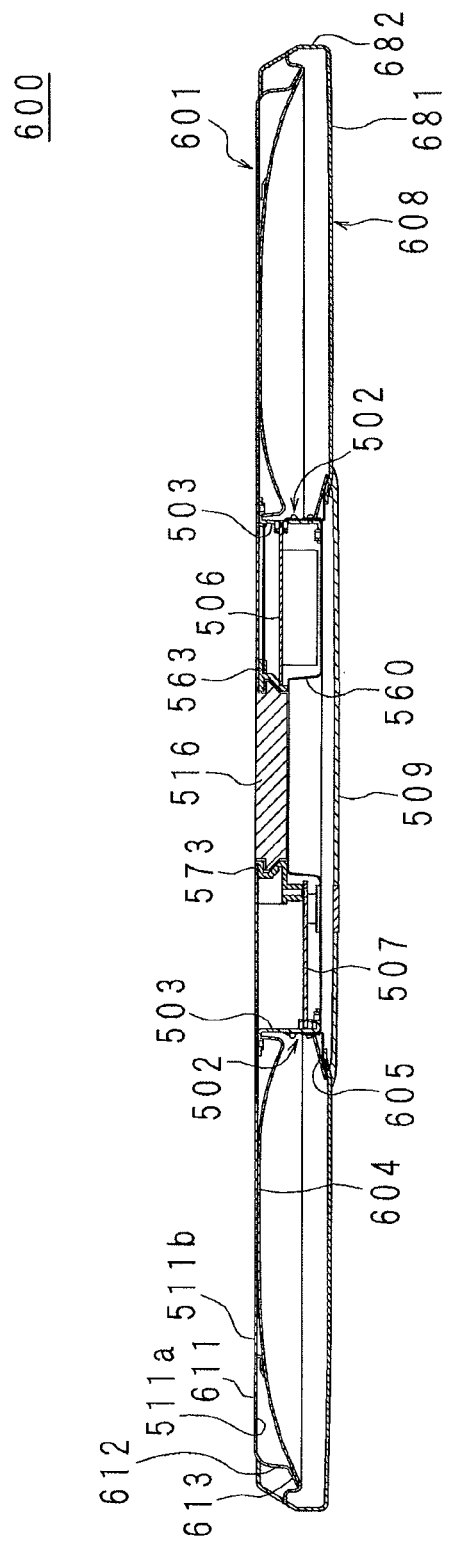
REPLACEMENT SHEET
FIG. 29

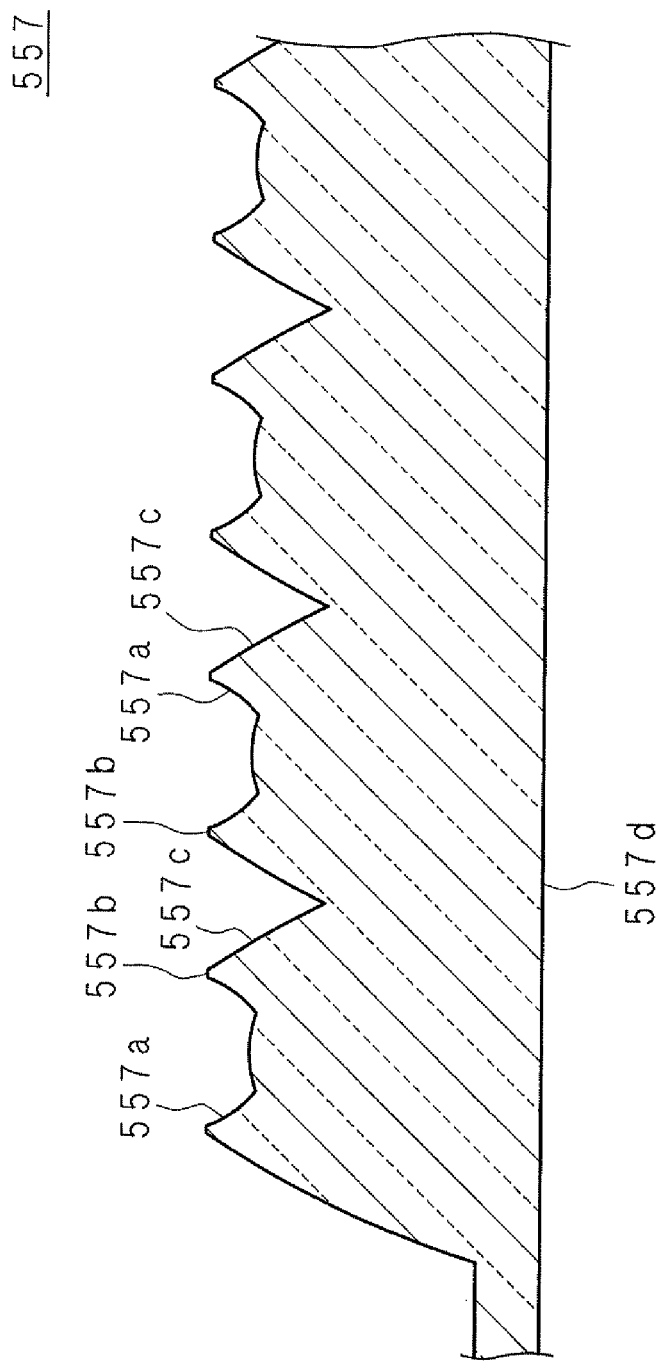

804

804

804

LIGHTING APPARATUS

This application is the national phase under 35 U.S.C. §371 of PCT International Application No. PCT/JP2011/056054 which has an International filing date of Mar. 15, 2011 and designated the United States of America.

BACKGROUND

1. Technical Field

The present invention relates to a lighting apparatus provided with a light source and an optical control member controlling the direction of light emission from the light source.

2. Description of Related Art

Conventionally, a lighting apparatus provided with a light source such as an incandescent light bulb and a fluorescent light is used as the lighting apparatus to be utilized in indoor illumination in a residential building and the like. In recent years, due to the high luminance of a light emitting diode (hereinafter referred to as LED), a lighting apparatus provided with an LED as a light source having properties of compact, lower power consumption, longer durability and the like is proposed to replace a conventional light source (for example, see Japanese Patent Application Laid-Open No. 2008-300203).

The lighting equipment disclosed in Japanese Patent Application Laid-Open No. 2008-300203 is provided with a lighting equipment main body 1010, semiconductor light emitting devices (corresponding to a light source) 1021 arranged on outer edge portions 1014, 1015 of the lighting equipment main body 1010, a lens body 1030 arranged opposite to the direction of light emission from the semiconductor light emitting devices 1021 for controlling mainly light emitted from the semiconductor light emitting devices 1021 in parallel direction, a reflector 1040 facing to the semiconductor light emitting devices 1021 and inclined toward substantially central side of the lighting equipment main body 1010, a globe 1050 covering the semiconductor light emitting devices 1021 and the reflector 1040 (see FIG. 39). The lighting equipment main body 1010 has a rectangular plate shape and is provided with an adaptor 1012 fitted to a suspended ceiling device 1011 at the substantially central side.

The lighting equipment related to Japanese Patent Application Laid-Open No. 2008-300203 is utilized as a so-called ceiling light, in which the lighting equipment main body 1010 is attached to an equipment clamp face A by engaging the adaptor 1012 to the suspended ceiling device 1011 arranged on the equipment clamp face A such as a ceiling plane of a residential building and so on. Due to a lighting of the lighting equipment, the light emitted from the semiconductor light emitting devices 1021 is in parallel direction relative to the lens body 1030. In other words, the light is emitted to the inclined portion of the reflector 1040 and then the light is further reflected on the reflector 1040 and incident on the globe 1050.

SUMMARY

However, with regard to the lighting equipment related to Japanese Patent Application Laid-Open No. 2008-300203, semiconductor light emitting devices 1021 as light sources are provided on outer edge portions 1014, 1015 of the lighting equipment main body 1010, therefore, the weight of the semiconductor light emitting devices 1021 as light sources and the wires are loaded on the outer edge portions 1014, 1015 of the lighting equipment main body 1010. The lighting equipment related to Japanese Patent Application Laid-Open No. 2008-300203, as described above, is configured to be secured on the attaching material located at the center of the lighting equipment main body 1010.

Since the weight is loaded on the outer edge portions 1014, 1015 of the lighting equipment main body 1010, the moment acts and a larger downward force acts according to the distance between the fulcrum and load center (the distance between the outer edge portions 1014, 1015 and the light equipment main body 1010) compared with the case where light sources or the like are arranged at the center of the lighting equipment main body 1010. As a result, the deformation such as bending may be appeared on the lighting equipment main body 1010.

In view of the present invention, it aims to provide a lighting apparatus capable of preventing the deformation such as bending of a lighting apparatus main body.

A lighting apparatus related to the present invention includes a plurality of light sources held by an apparatus main body for emitting light toward an outer edge portion of the apparatus main body and an optical control member for controlling the direction of light emission from the plurality of light sources to perform illumination.

The present invention includes the plurality of light sources held by the apparatus main body for emitting light toward the outer edge portion of the lighting apparatus main body and the optical control member for controlling the direction of light emission from the plurality of light sources to perform an illumination. The light sources are not provided at the outer edge portion of the lighting apparatus so that the moment acting on the apparatus main body holding the light source can be reduced as compared with the case where the light sources are provided at the outer edge portion of the lighting apparatus. Therefore, the deformation such as bending of the lighting apparatus can be prevented.

According to the lighting apparatus related to the present invention, the optical control member is a light guiding member with a hole, and the light sources are provided such that light is incident on the optical control member from a peripheral surface of the hole.

The present invention uses the light guiding member with the hole as the optical control member, and the light sources are provided such that the light is incident on the optical control member from the peripheral surface of the hole. A part of the light emitted from the light sources and being incident from the peripheral surface of the hole at the center portion of the optical control member is totally reflected inside the optical control member and spread toward the outer edge portion of the optical control member so that it can be brightly illuminated toward the outer edge portion of the lighting apparatus. Therefore, a substantially uniform plane emission can be achieved.

According to the lighting apparatus related to the present invention, an inclined surface, which is inclined to the direction crossing the direction of light emission from the light sources, is provided at an outer edge portion of the optical control member.

The present invention is provided with the inclined surface inclined to the direction crossing the direction of light emission from the light sources, at the outer edge portion of the optical control member. For example, in a case where a light guiding plate is used as the optical control member, the total reflection occurs when a smaller angle is formed between light emitted from the light source and being incident from the side of the light guiding plate and the surface of the light guiding plate. By providing the inclined surface, it is possible that a part of the light from the light source is emitted to outside the lighting apparatus from the inclined surface provided at the outer edge portion of the optical control member because the angle formed between the light and the inclined surface of the light guiding plate can be made larger than the total reflection angle. For example, in a case where the lighting apparatus is installed into ceiling, a part of the light emitted from the light source is outputted toward ceiling so that an entire room becomes brighter to the user even if the total luminance flux is lower.

According to the lighting apparatus related to the present invention, the optical control member forms a plate shape, and a plurality of reflecting sections are provided for diffusing the light emitted from the light source at one surface of the optical control member. The plurality of reflecting sections are provided such that the size of the area (large/small) of diffusing the light emitted from the light source corresponds to the distance (far/near) from the light source.

According to the present invention, the plurality of reflecting sections for diffusing light emitted from the light source are provided such that the size of the area (large/small) of diffusing the light emitted from the light source corresponds to the distance (far/near) from the light source, at one surface of the plate-shaped optical control member. The intensity of light becomes weaker as being away from the light source. However, as light is incident on the reflecting section and the area of the reflecting section to perform diffusion becomes larger, the amount of light diffused into the reflecting section can also be reserved sufficiently at the outer edge portion of the optical control member. That is, the full amount of light can exit from the surface of the one surface at the opposite side on a substantially entire surface from the central portion to the outer edge portion. Therefore, a substantially uniform plane emission can be achieved.

In the lighting apparatus related to the present invention, the optical control member is formed such that the change in thickness (decrease/increase) corresponds to the distance (far/near) from the light source.

In the present invention, the optical control member is formed such that the change in thickness (decrease/increase) corresponds to the distance (far/near) from the light source. The light source is arranged opposite to the optical control member, and the thickness at the side of the hole of the optical control member on which the light from the light source is incident can be thickened with respect to the size of the light source so that the loss of light, which is not incident on the optical control member, can be reduced. Therefore, the optical usage efficiency, that is, the equipment efficiency of the entire lighting apparatus can be improved.

According to the present invention, the deformation such as bending of the lighting apparatus main body can be prevented.

The above and further objects and features will more fully be apparent from the following detailed description with accompanying drawings.

BRIEF DESCRIPTION OF THE DRAWING

FIG. 29 is a schematic cross-sectional view of a lighting apparatus in accordance with Embodiment 6 of the present invention.

FIG. 37 is a schematic cross-sectional view illustrating an example of another applicable lens in Embodiment 9.

DETAILED DESCRIPTION

An example of a lighting apparatus disposed at an attaching member such as ceiling based on drawings illustrating the embodiments of the present invention is described below in detail.

(Embodiment 1)

Figure 1:
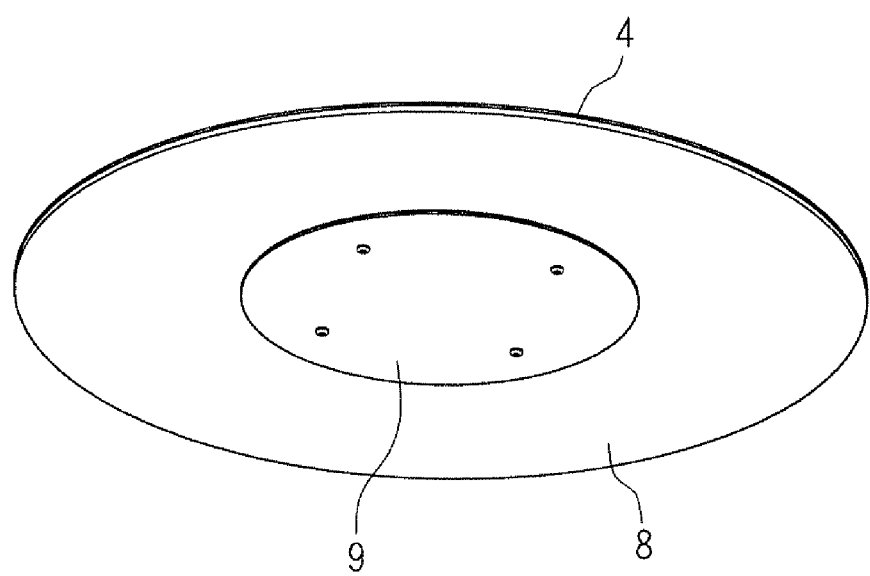
FIG. 1 is a schematic outline perspective view of a lighting apparatus in accordance with Embodiment 1 of the present invention.
Figure 2:
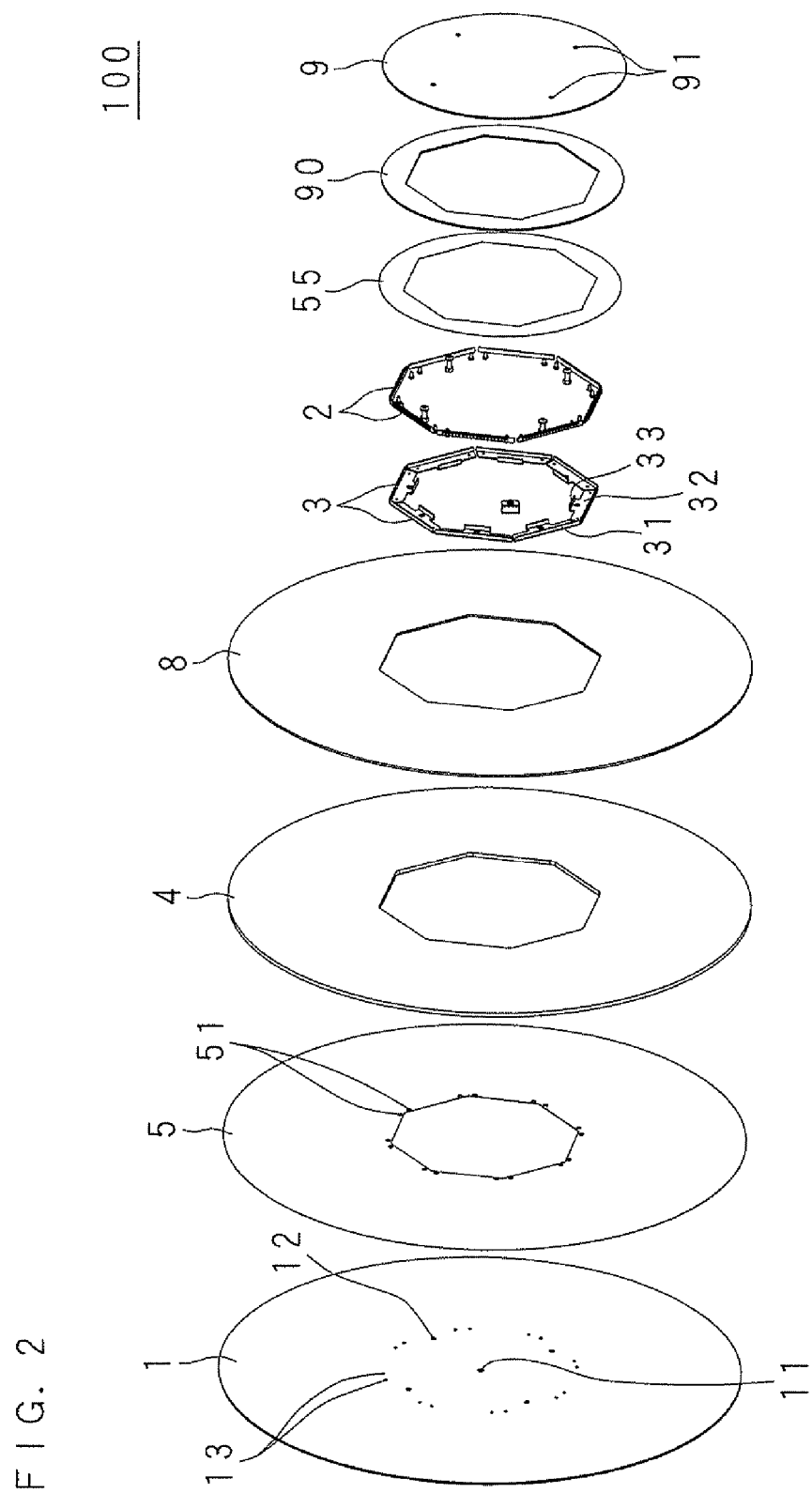
FIG. 2 is a schematic exploded perspective view of the lighting apparatus in accordance with Embodiment 1.
Figure 3:
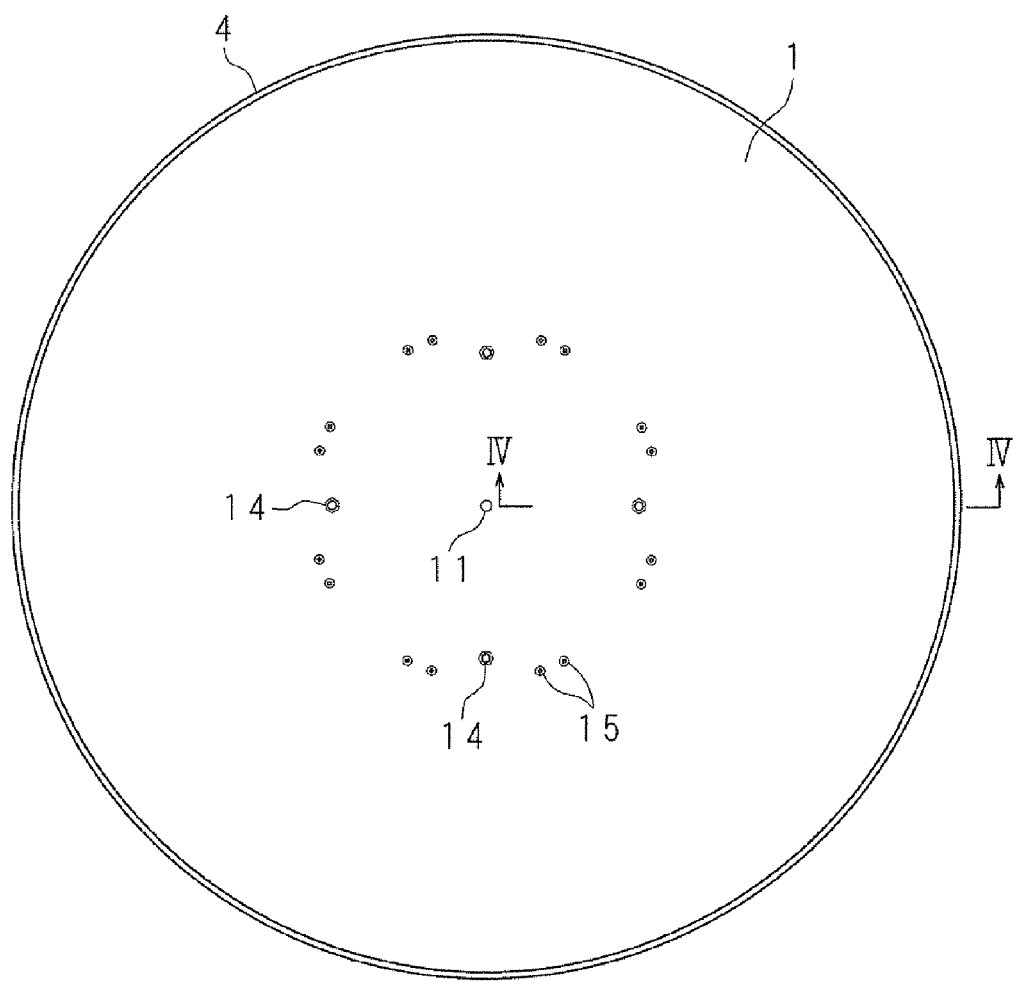
FIG. 3 is a schematic rear view of the lighting apparatus in accordance with Embodiment 1.
Figure 4:
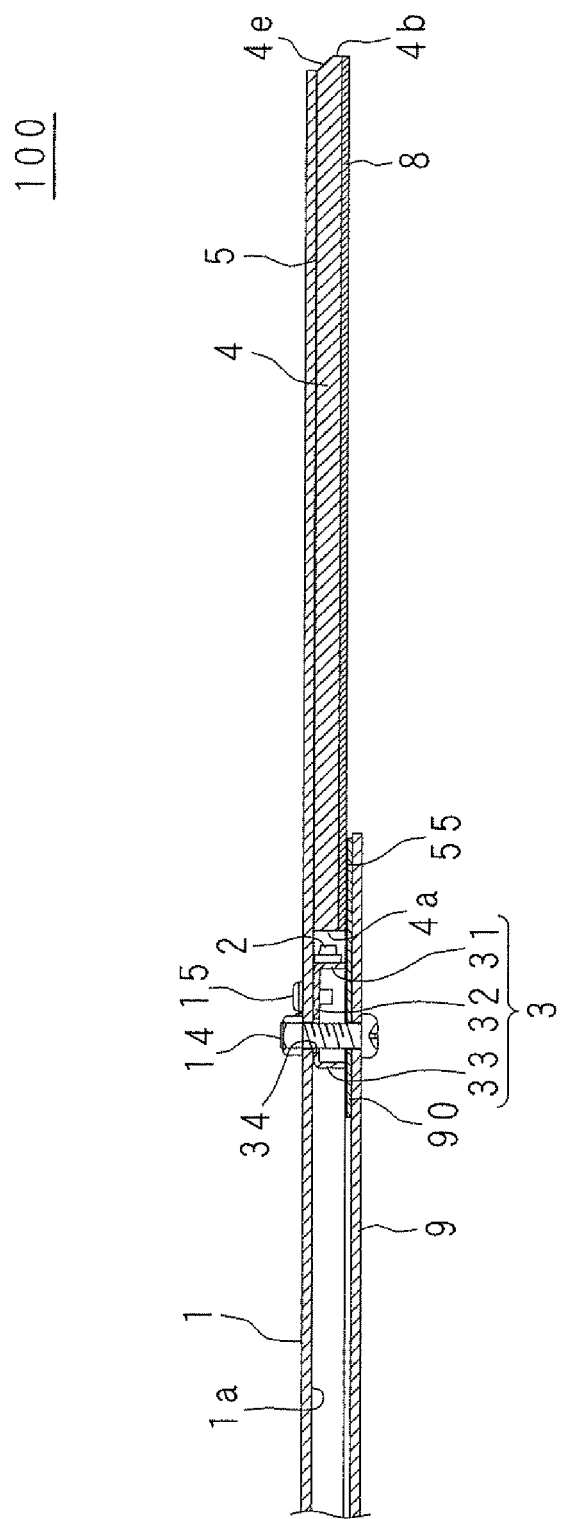
FIG. 4 is a schematic cross-sectional view taken along the line IV-IV of FIG. 3.

FIG. 1 is a schematic outline perspective view of a lighting apparatus 100 in accordance with Embodiment 1 of the present invention. FIG. 2 is a schematic exploded perspective view of the lighting apparatus 100 in accordance with Embodiment 1. FIG. 3 is a schematic rear view of the lighting apparatus 100 in accordance with Embodiment 1. FIG. 4 is a schematic cross-sectional view taken along the line IV-IV of FIG. 3.

Numeral reference 1 in figures is a chassis as a lighting apparatus main body for holding a light source described below. The chassis 1 is provided with a circular hole 11 at the center. The wire connected between a power supply section and a light source is inserted into the hole 11. The chassis 1 is made of metal such as iron or aluminum. Moreover, the chassis 1 functions as a heat sink radiating heat generated in a heat radiator such as a light source.

At the chassis 1, four through holes 12 are provided at the chassis 1 in the circumferential direction with equal intervals, for aligning to the installation position of an after-mentioned light source holding section. A threaded screw hole 13 is provided at the chassis 1, for aligning to the installation position of the light source holding section.

Figure 5:
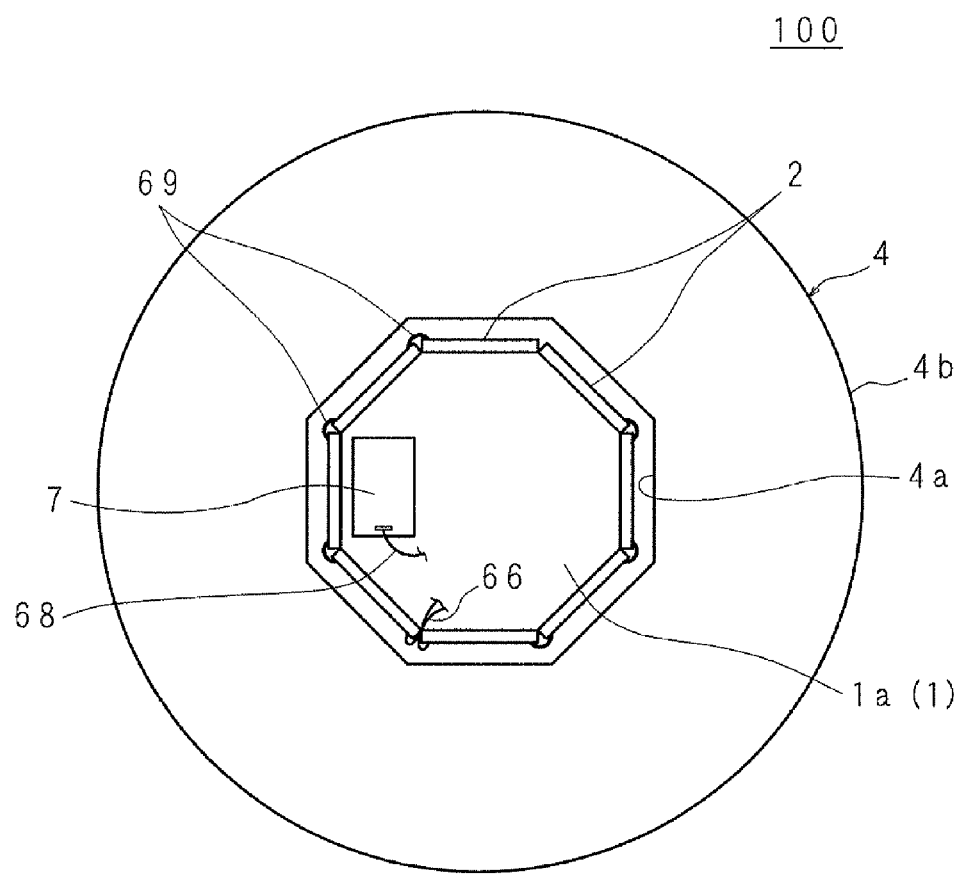
FIG. 5 illustrates an arrangement of essential parts of the lighting apparatus in accordance with Embodiment 1.
Figure 6:
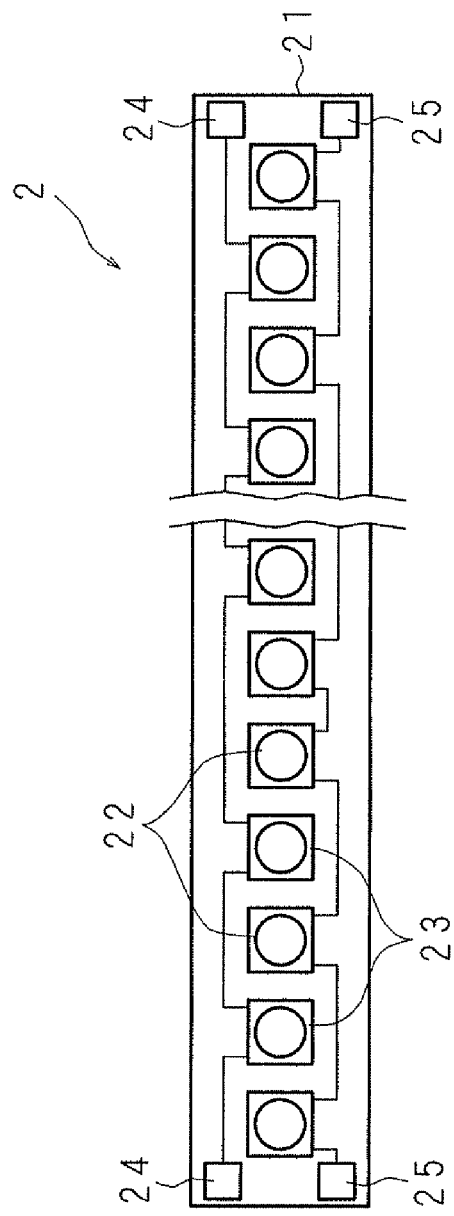
FIG. 6 is a schematic view of an LED module of the lighting apparatus in accordance with Embodiment 1.

LED modules 2 as a light source are attached through the light source holding section 3 to one surface 1a of the chassis 1. FIG. 5 illustrates an arrangement of essential parts of the lighting apparatus 100 in accordance with Embodiment 1. FIG. 6 is a schematic view of the LED module 2 of the lighting apparatus 100 in accordance with Embodiment 1.

As shown in FIG. 6, the LED module 2 is provided with a rectangular plated LED substrate 21, a plurality of daylight LEDs 22 mounted on the LED substrate 21 along the long side in series that emit the light with daylight color, and a plurality of incandescent LEDs 23 mounted between daylight LEDs 22 that emit the light with incandescent color. The light emitting sections (the parts of an LED element and sealing resin noted as circles in the figure) of the daylight LED 22 and the incandescent LED 23 are at the inner side. The daylight LED 22 and the incandescent LED 23 are arranged alternately such that the light emitting sections of the daylight LEDs 22 and the incandescent LEDs 23 are arranged on a substantially straight line.

The daylight LED 22 and the incandescent LED 23 are surface mount type LED including, for example, an LED element, a hemispherical sealing resin in which phosphors are scattered covering the LED element, an input terminal, and an output terminal. The LED substrate 21 is made of a metal such as iron or aluminum, and it functions as a heat conductor conducting heat generated in the daylight LED 22 and the incandescent LED 23 to the light source holding section 3. Moreover, it is preferable that the LED substrate 21 is made of iron, because the coefficient of thermal expansion of iron is close to that of the resin of the daylight LED 22 and the incandescent LED 23.

In the present embodiment, the daylight LEDs 22 and the incandescent LEDs 23 are arranged on the LED substrate 21 such that the space between the neighboring daylight LEDs 22 or the neighboring incandescent LEDs 23 is substantially the same. However, it is preferable that the space between the neighboring daylight LEDs 22 gradually becomes closer from the center of the long side of the LED substrate 21 toward the end. As similar to the present embodiment, in a case where the plurality of LED modules 2 are arranged in multangular shape, increasing darkness at the boundary division section between neighboring LED modules 2 can be prevented, the light from the LED module 2 exits uniformly in order that the difference of luminance does not occur corresponding to positions in peripheral direction. Moreover, in a case where the LED modules are arranged roundly on a flexible substrate and the like, it is preferable that the LED modules are arranged such that the space between neighboring LEDs is substantially the same as similar to the present embodiment.

In the LED modules 2 related to the present embodiment, the light emitting sections of the daylight LEDs 22 and the incandescent LEDs 23 are arranged on a substantially straight line. Therefore, as compared with the case of being arranged in parallel, the LED modules 2 faces to a peripheral surface 4a of the hole of the optical control member for the purpose of reducing the amount of light which is not incident on the optical control member for controlling the direction of light emission from the LED modules 2 so that it is easy to arrange for packing the light emitting sections of the LED modules 2 within the thickness of the peripheral surface 4a. As a result, the efficiency of light usage of the entire lighting apparatus, that is, the apparatus efficiency can be improved.

A first connecting section 25 is arranged on both ends of a circuit pattern for power supply in which the plurality of daylight LEDs 22 are connected in series. Similarly, a second connecting section 24 is arranged on both ends of a circuit pattern for power supply in which the plurality of incandescent LEDs 23 are connected in series.

With regard to the connection between the plurality of LED modules 2, these first connecting section 25 and second connecting section 24 are connected to each other by wires 69 as jumper cables connecting through the solder of each first connecting section 25 and second connecting section 24. Moreover, as shown in FIG. 5, eight LED modules 2 are divided into two groups, and four LED modules 2 are connected in series by the wire 69 in each group in the present embodiment. Therefore, the plurality of LED modules 2 are connected to the power supply section by using the wire 66 to make a connection between the first connecting section 25 and the second connecting section 24 of the LED module 2 and the after-mentioned power supply section at the edge portion of one side of each group.

As shown in FIG. 4, the light source holding section 3 forms into a flat U-shape as the cross-sectional shape and is provided with a rectangular-plate holding plate portion 31 attached and held by the LED module 2, a fixing plate portion 32 connected to the holding plate portion 31 in a substantially right angle at the longer side of the holding plate portion 31 and fixed to the chassis 1, and a supporting plate portion 33 provided from one portion of the longer side of the fixing plate portion 32 at the opposite side of the holding plate portion 31 that faces with the holding plate portion 31 in parallel. The light source holding section 3 is made of metal such as aluminum, and it also functions as a heat conductor for conducting the heat radiated from the LED modules 2 as a heat radiator to the chassis 1 as a heat sink.

The LED module 2 is fixed to the holding plate portion 31 by a threaded screw and the like at the non-mounting surface of the LED substrate 21 (the surface opposite to the surface on which the daylight LEDs 22 and the incandescent LEDs 23 are mounted) so that the longitudinal direction of the LED substrate 21 is at the longitudinal direction of the holding plate portion 32. A through hole 34 is provided at the central portion in the longitudinal direction of the fixing plate portion 32. Threaded screw holes are provided at both ends of the fixing plate portion 32 in the longitudinal direction, respectively.

The light source holding section 3 is substantially equally distributed at the chassis 1 in a circumferential direction and fixed to the holding plate portion 31 by screwing the threaded screw 15 at the threaded hole provided at the fixing plate portion 32 and the threaded hole 13 provided at the chassis 1 such that the surface of the holding plate 31 with the LED modules 2 faces to the outer edge of the chassis 1, an octagonal peripheral wall is formed by the holding plates 32, and the light source holding section 3 is carried on one surface 1a of the chassis 1. In this way, the light source holding section 3 is attached to the chassis 1, the LED module 2 is supported such that the LED substrate 21 crosses the chassis 1 at a substantially right angle in a radial direction. As shown in FIG. 5, the LED modules 2 are arranged in an octagon shape on the chassis 1. When the LED module 2 is lighted up, the light emitted from the LED module 2 is radiated in a radial manner to the direction from the central portion of the lighting apparatus 100 (chassis 1) to the outer edge portion.

Figure 7:
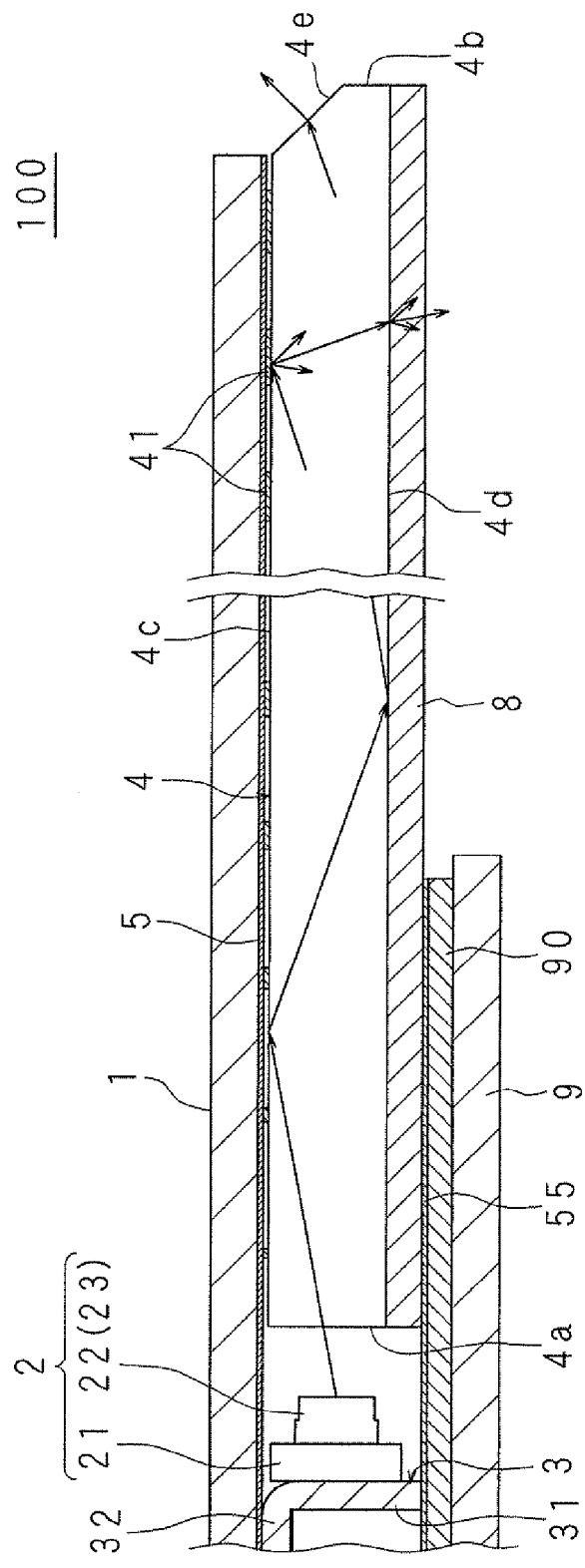
FIG. 7 is a local enlarged cross-sectional view of essential parts of the lighting apparatus in accordance with Embodiment 1.

A light guiding plate as an optical control member is provided for controlling the direction of light emission from the LED modules 2, at the chassis 1. FIG. 7 is a local enlarged cross-sectional view of essential parts of the lighting apparatus 100 in accordance with Embodiment 1.

The disc-shaped light guiding plate 4 has an octagonal hole matching to the arrangement shape of the LED module 2 at the center. The light guiding plate 4 is made of material with high optical transparency. For example, the light guiding plate 4 is made of an acryl resin. It is preferable that the thickness of the light guiding plate 4 is larger than the dimensions of the light emitting sections of the daylight LEDs 22 and the incandescent LEDs 23 of the LED module 2. Moreover, it is preferable that the light guiding plate 4 is arranged at the chassis 1 so that the optical axis of the LED module 2 is placed at the substantial central portion of the light guiding plate 4 in the depth-wise direction. By making the thickness of the light guiding plate 4 larger than the size of the light emitting section of an LED and/or matching the optical axis of the LED module 2 to the center position in the depth-wise direction of the light guiding plate 4, the amount of light not incident on the light guiding plate can be reduced so that the efficiency of light usage of the entire lighting apparatus, that is, the apparatus efficiency can be improved.

The light guiding plate 4 is arranged on one surface 1a of the chassis 1 such that each LED module 2 is separated from the peripheral surface 4a of the hole with appropriate distance and opposite to the peripheral surface 4a of the hole, more specifically, the LED modules 2 and the light guiding plate 4 are placed on the borderline of two concentric octagonal shapes respectively as shown in FIG. 5. In other words, with regard to the light guiding plate 4 and each LED module 2, each LED module 2 is separated from the peripheral surface 4a of the hole of the light guiding plate 4 with similar space and parallel to the peripheral surface 4a of the hole of the light guiding plate 4. The space between the LED module 2 and the peripheral surface 4a of the hole of the light guiding plate 4 is appropriately determined such that the light emitted from the LED module 2 with certain degree of broadness is incident on the peripheral surface 4a and the heat generated in the LED module 2 is difficult to be transmitted to the light guiding plate 4.

A plurality of reflection dots 41 as a reflecting section for diffusing light emitted from the LED module 2 are printed on one surface 4c of the light guiding plate 4. The reflection dot 41 is formed into a circular shape and provided such that the area of diffusing light emitted from the LED module 2, for example, the size of the area (large/small) of the reflection dot 41 in the present embodiment corresponds to the distance (far/near) from the light module 2. More specifically, the reflection dots 41 printed on one surface 4c of the light guiding plate 4 are arranged and printed densely by making smaller the circular pattern printed at the vicinity of the LED modules 2. By using a coating mixed with moderate amount of diffusion material, the reflection dots 41 are formed through printing such as silkscreen printing on one surface 4c of the light guiding plate 4.

In a case where the reflecting dots 41 are not provided, the light from the LED modules 2 entering into the light guiding plate 4 spreads toward the outer edge portion of the light guiding plate 4 and total reflection is repeated so that the light exits from the outer edge portion of the light guiding plate 41 in the direction along the flat surface of the light guiding plate 4. However, in a case where the reflecting dot 41 is provided, the light is diffused into the reflecting dot 41, and a part of light exits from one other surface 4d of the light guiding plate 4. As a result, a substantially plane emission can be achieved. Moreover, in a case where the LED modules 2 are arranged into an octagonal shape in the present embodiment, it is preferable that the pattern of the reflecting dots 41 is varied at the other region such that the region between the adjacent LED modules 2 (the region including the boundary of adjacent LED modules 2 in a radial direction) does not become darker. For example, it is preferable by making the area of each dot in the region between adjacent LED modules 2 larger and/or increasing the number of dots.

An inclined surface 4e inclined to the direction crossing the direction of light emission from the LED module 2 is formed across the substantially whole circumference between the outer peripheral surface 4b and the one surface 4c of the light guiding plate 4. The light emitted from the LED module 2, which is incident from the peripheral surface 4a of the light guiding plate 4, is totally reflected when the angle between the incident light and the surface of the light guiding plate 4 is smaller. Providing the inclined surface 4e can make the angle formed between the light and the surface of the light guiding plate 4 larger than the total reflection angle. As indicated by arrows shown in FIG. 7, a part of the light emitted from the LED module 2 is possible to exit to outside the lighting apparatus 100 from the inclined surface 4e provided at the outer edge portion of the light guiding plate 4.

The reflection sheet 5 is inserted between the chassis 1 and the light guiding plate 4. The reflection sheet 5 forms into a disc shape with an octagonal hole matching to the arrangement shape of the LED modules 2 at the center. The reflection sheet 5 is made of material with high optical reflectance such as PET (Polyethylene terephthalate). Threaded holes 51 are provided at the reflection sheet 5 such that the threaded holes 51 match to the threaded holes 13 of the chassis 1. When the light source holding section 3 is attached to the chassis 1, the reflection sheet 5 is carried on one surface 1a of the chassis in advance and attached to the chassis 1 along with the light source holding section 3 through the threaded screw 15 such that the threaded holes 51 matches to the threaded holes 13 of the chassis 1.

The light is diffused by the reflection dots 41 of the light guiding plate 4, and one part of the light is reflected and again incident on the light guiding plate 4 from one surface 4c of the light guiding plate 4. Among the incident lights, in a case where the angle between the light and one surface 4c is larger, a part of the light exits from one surface 4c of the light guiding plate 4 without being reflected. The exiting light is reflected on the reflection sheet at the side of the one other surface 4d.

A rectangular plated control substrate 7 is attached through a control substrate supporting section (not shown) to one surface 1a of the chassis 1 surrounded by the light source holding section 3. Electronics components such as a microcontroller and dimmer control circuit (not shown) are mounted on the control substrate 7. The control substrate 7 is electrically connected to the power supply section through the wire 68.

A diffusion plate 8 is provided at the one other surface 4d of the light guiding plate 4. The diffusion plate 8 forms into a disc shape with an octagonal hole matching to the arrangement shape of the LED modules 2. The diameter of the diffusion plate 8 is substantially the same as the diameter of one other surface 4d of the light guiding plate 4. The diffusion plate 8 is made of milky-white resin with added diffusion material.

A part of the light diffused by the reflection dots 41 of the light guiding plate 4 exits from one other surface 4d without being total reflected in a case where the angle formed between the one other surface 4d and the light is larger. The light emitted from the one other surface 4d is diffused and penetrates through the diffusion plate 8, and then the light exits toward the opposite side (e.g., flooring) of the attaching member such as ceiling. The light emitted from the side of the one other surface 4d of the light guiding plate 4 at outside the lighting apparatus 100 is diffused inside the diffusion plate 8 and then an entire room is illuminated uniformly. The light distribution of the lighting apparatus 100 can be broadened by providing the diffusion plate 8.

As described above, the chassis 1 is provided with the LED modules 2, the light source holding section 3, the light guiding plate 4, the reflection sheet 5 and the diffusion plate 8. A disc center cover 9 is attached to the chassis 1 through a cushion 90 and a top plate reflection sheet 55. Four through holes 91 are provided on the center cover 9 in the circumferential direction with equal spacing such that the through holes 91 matches to the through holes 12 provided at the chassis 1, in other words, the thorough holes 91 matches to the installation location of the light source holding section 3.

The top-plate reflection sheet 55 is formed into a disc shape with an octagonal hole matching to the arrangement shape of the LED modules 2 at the center. The diameter of the top plate reflection sheet 55 is slightly shorter than that of the center cover 9. The octagonal hole of the top plate reflection sheet 55 is formed into a smaller shape than the octagonal shape formed by the plurality of supporting plates 33 of the light source holding section 3. The top-plate reflection sheet 55 is made of material with high optical reflectance such as PET (Polyethylene terephthalate).

The top-plate reflection sheet 55 is provided at the opposite side of the reflection sheet 5 with respect to the light guiding plate 4. The light, which is emitted from the LED module 2 and reflected on the peripheral surface 4a of the light guiding plate 4, in other words, not incident on the light guiding plate 4, is reflected on the top-plate reflection sheet 5 in the direction with respect to the light guiding plate 4, the reflection sheet 5, the diffusion plate 8 and the like so that the efficiency of light usage of the entire lighting apparatus, that is, the apparatus efficiency can be improved.

The cushion 90 has similar shape to the top-plate reflection sheet 55. The cushion 90 and the top-plate reflection sheet 55 are tack welded to, for example, the center cover 9 through adhesive agent and the like. The center cover 9 is carried on the light source holding section 3 and the diffusion plate 8 in a state where the through holes 91 of the center cover 9 align to the through holes 12 of the chassis 1 and the through holes 34 of the fixing plate 32 of the light source holding section 3, and then the center cover 9, the chassis 1 and the light source holding section are formed into an integrated body through fastening members 14. The chassis 1 and the center cover 9 has a function as a holding member for holding the LED modules 2, the light source holding section 3, the light guiding plate 4, the reflection sheet 5 and the diffusion plate 8.

In this present embodiment, bolts and nuts are used as the fastening members 14. The bolts are inserted through respective through holes 91, 34, 12 from the side of the center cover 9. By screwing with nuts arranged on the one other surface (the surface at the opposite side of the one surface 1a), the light source holding section 3 with the LED modules 2, the light guiding plate 4, the reflection sheet 5, the diffusion plate 8 and the like are pinched between the chassis 1 and the center cover 9 and formed into an integrated body. The cushion 90 inserted between the center cover 9 and the light source holding section 3 and the diffusion plate 8 is compressed with respect to the fastening force of the fastening members, therefore, a substantially equal force is acting by the chassis 1 and the center cover 9 on the members in the circumferential direction such as the light source holding section 3, the light guiding plate 4 and the diffusion plate 8 so that the cushion 90 is stably held. A sealing cavity is to be formed through the chassis 1, the light source holding section 3, the light guiding plate 4 and the diffusion plate 8. The LED modules 2 as the light sources are housed in the cavity, therefore, a portion of the LED modules 2 can be sealed. Moreover, the fastening members 14 are not limited to bolts and nuts.

Figure 8:
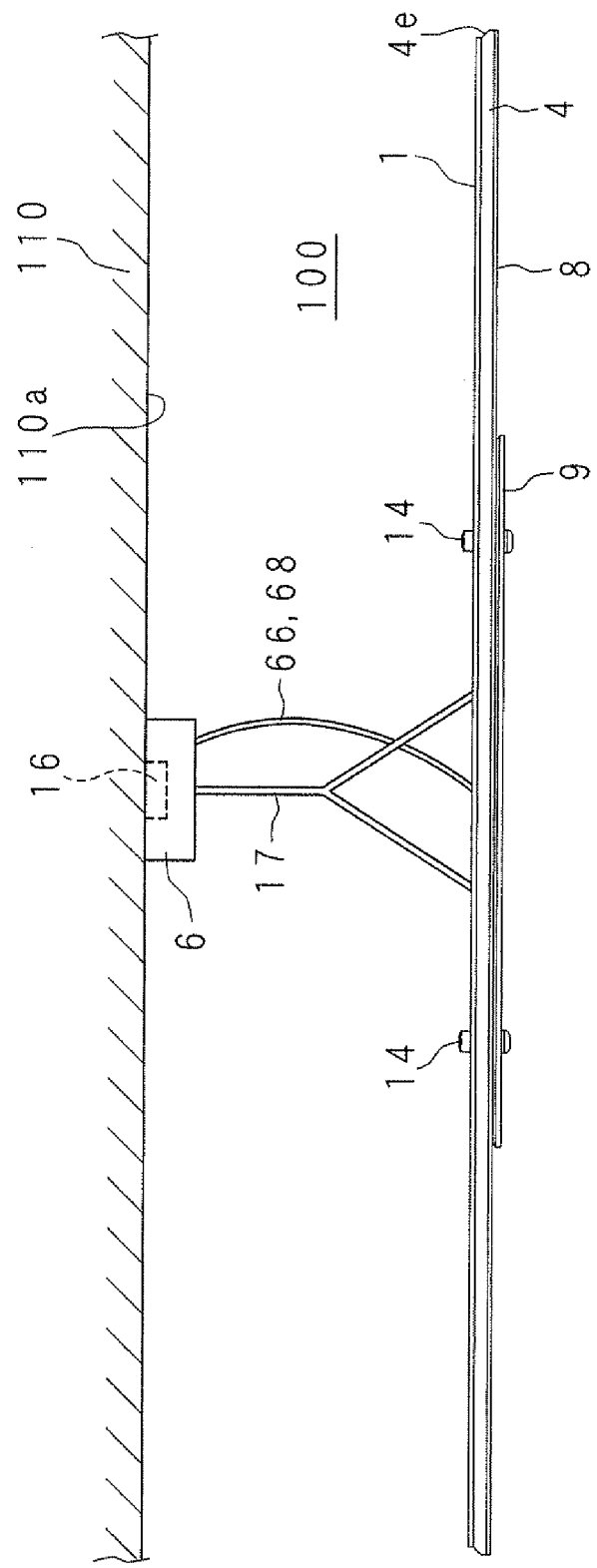
FIG. 8 illustrates an installation condition to the ceiling as an attaching member of the lighting apparatus in accordance with Embodiment 1.

FIG. 8 is a view showing an example of installation condition of lighting apparatus at ceiling 100 as the attaching member of the lighting apparatus 100 in accordance with Embodiment 1. With regard to the lighting apparatus 100 related to Embodiment 1, the detachable power supply section 6 for supplying the power to the LED modules 2 is attached to the attaching body (not shown) such as suspended ceiling body provided at the ceiling 110 as the attaching body through an adaptor 16.

The adaptor 16 forms a flat cylindrical shape. The adaptor 16 is provided with a hook blade engaging to an engaging hole of an attaching body such as a suspended ceiling body to be attached to an attaching member at one end side, and a connector connected to the power supply section 6. By engaging the hook blade to the engaging hole of the attaching body, the adaptor 16 is electrically and mechanically connected to the attaching body. The adaptor 16 is a well-known art, therefore, the detailed explanation is omitted.

The power supply section 6 includes a housing formed into a cylindrical shape with a flat base and provided with a circular hole at one part, a power supply substrate accommodated inside the housing, electronic components such as a rectifier circuit mounted to the power supply substrate that rectifies current supplied from an alternator (AC generator) and a transformer transforming the rectified potential into a predetermined potential, and a power supply substrate supporting section for holding the power supply substrate in the housing. As the adaptor 16 is attached to the circular hole provided at the housing of the power supply section 6 and the adaptor 16 is engaged to the attaching body provided at the ceiling 100, the adaptor 16 is connected and attached to the attaching body and the power supply section 6 is attached to the ceiling 100 as an attaching member at the same time.

Moreover, by connecting the connector of the adaptor 16 with the connector of the power supply section 6, the power supply section 6 is electrically connected to the attaching body. The LED modules 2 are connected to the power supply section 6 through the wire 66. Additionally, the power substrate 7 is connected to the power supply section 6 through the wire 68. With regard to the present embodiment, the control substrate 7 is attached to the chassis 1. However, the control substrate 7 may also be provided inside the housing of the power supply section 6.

A suspension tool 17 such as cord and chain fixed to one end of the chassis 1 is attached to the housing of the power supply section 6. The lighting apparatus 100 related to the present embodiment shown in FIG. 8 is a suspension-type lighting apparatus, that is, a pendent light suspended by the suspension tool 17 from the ceiling 110.

With regard to the lighting apparatus 100 related to Embodiment 1, the LED module 2 is arranged at the center portion of the chassis 1 (lighting apparatus) but not arranged at the outer edge portion of the lighting apparatus 100, therefore, the distance between the LED module 2 and the attachment site of the chassis 1 with respect to the ceiling 110 can be shortened. Compared with a case where the LED module 2 is arranged at the outer edge portion of the chassis 1 (lighting apparatus), the moment acting on the chassis 1 can be reduced. Therefore, the deformation of the chassis 1 can be prevented and hence the reliability of the lighting apparatus 100 can be improved. The power supply section 6 is arranged at the ceiling surface 110a which is at the top of the central portion of the chassis 1, therefore, the wires connecting the power supply section 6 and the LED module 2 can be concentrated at the side of the central portion of the chassis 1 so that the moment acting on the chassis 1 can be further reduced, the deformation of the chassis 1 is prevented and hence the reliability of the lighting apparatus 100 can be improved.

With regard to the lighting apparatus in accordance with Embodiment 1, the LED modules 2 as the light sources are arranged in a round octagonal shape at the central portion of the chassis 1 (lighting apparatus), and light is radiated radially toward the outer edge portion of the chassis 1. As compared with the case where the light source is provided at the outer edge portion of the chassis 1, the region for placing light sources can be minimized and the necessary number of light sources for uniform light emission from the light guiding plate 4 as the optical control member can be reduced. Moreover, the light is radiated radially toward the outer edge portion of the chassis 1, even if the lighting apparatus is up sized, uniform illumination can be achieved by only adjusting the intensity of light sources without increasing the number of light sources.

In the lighting apparatus 100 attached to the ceiling 110, the power supply section 6 is connected to an AC generator through the adaptor 16 and the attaching member such as the suspended ceiling body. In this status, when the power supply is on, an AC current is supplied to the power supply section 6, and then a power of a predetermined potential and current is supplied from the power supply section 6 to the LED module 2 and hence the LED module 2 having the daylight LED 22 and the incandescent LED 23 is lighted up.

With regard to the lighting apparatus 100 in accordance with Embodiment 1, the LED modules 2 are provided for emitting light toward the outer edge portion of the light guiding plate 4 as the optical control member for controlling the direction of light emission from the LED modules 2, that is, toward the outer edge portion of the lighting apparatus 100 (the chassis 1), at the central portion of the lighting apparatus 100. The LED modules 2 are opposite to the peripheral surface 4a of the hole of the light guiding plate 4. The LED modules 2 illuminates through the light guiding plate 4.

A large part of the light emitted from the LED modules 2 is incident on the light guiding plate 4 from the peripheral surface 4a of the hole of the light guiding plate 4 arranged opposite to the LED modules 2. A part of incident light is totally reflected repetitively between the one surface 4c and the one other surface 4d inside the light guiding plate 4. A part of the light is broadening toward the outer edge portion of the light guiding plate 4, therefore, it can brightly illuminate toward the outer edge portion of the lighting apparatus 100. As a result, a substantially plane emission can be achieved.

Moreover, the other part of the light incident on the light guiding plate 4 is diffused by the reflection dots 41 provided at the one surface 4c of the light guiding plate 4, and then a part of diffused light exits from the one other surface 4d of the light guiding plate 4, and the other part of diffused light is further reflected on the one other surface 4d of the light guiding plate 4. In this way, the light incident on the reflection dots 41 is emitted in many directions so that a substantially uniform plane emission can be achieved from the central portion to the outer edge portion of the light guiding plate 4.

The reflection dots 41 are provided such that the area of diffusing light emitted from the LED modules 2, that is, the area (large/small) of the reflection dot 41 in the present embodiment corresponds to the distance (far/near) from the LED modules 2. Light intensity gets weaker as being away from the LED modules 2, however, the area of the reflection dot 41 of diffusing the incident light emitted from the LED modules 2 become larger so that the amount of light diffused by the reflection dots 41 can be ensured at the outer edge portion of the light guiding plate 4. In other words, sufficient amount of light can exit from the one other surface 4d with respect to a substantially whole surface from the central portion to the outer edge portion of the light guiding plate 4, therefore, a substantially plane emission can be achieved.

With regard to the light emitted from the LED modules 2 being incident from the peripheral surface 4a of the light guiding plate 4, when the angle formed between the incident light and the surface of the light guiding plate 4 is smaller, the total reflection occurs. As the inclined surface 4e, which is inclined to the direction crossing the direction of light emission from the LED modules 2, is formed across a substantially whole periphery between the outer peripheral surface 4b and the one surface 4c of the light guiding plate 4, the angle formed between the light and the inclined surface 4e of the light guiding plate 4 can be made larger than the total reflection angle. Therefore, a part of the light emitted from the LED modules 2 exits to outside the lighting apparatus 100 from the inclined surface 4e provided at the outer edge portion of the light guiding plate 4.

As shown in FIG. 8, when the lighting apparatus 100 is installed in the ceiling 110, the light radiated from the inclined surface 4e illuminates the ceiling surface 110a, wall surface of a room and the like. In this way, by illuminating the ceiling surface 110a, wall surface of a room and the like, even in a case where the total flux of the lighting apparatus 100 is low, the user can feel that an entire room is brightly illuminated. Since it is possible for the user to feel that an entire room is brightly illuminated, even when the total flux of the lighting apparatus 100 is low, the number of LEDs to be utilized can be reduced so that the cost reduction and power saving can be achieved.

The light guiding plate 4 is used as an optical control member, therefore, the thickness of the lighting apparatus 100 in a depth-wise direction of the light guiding plate 4 is smaller, and a lightweight and less expensive lighting apparatus 100 is disclosed.

(Embodiment 2)

Figure 9:
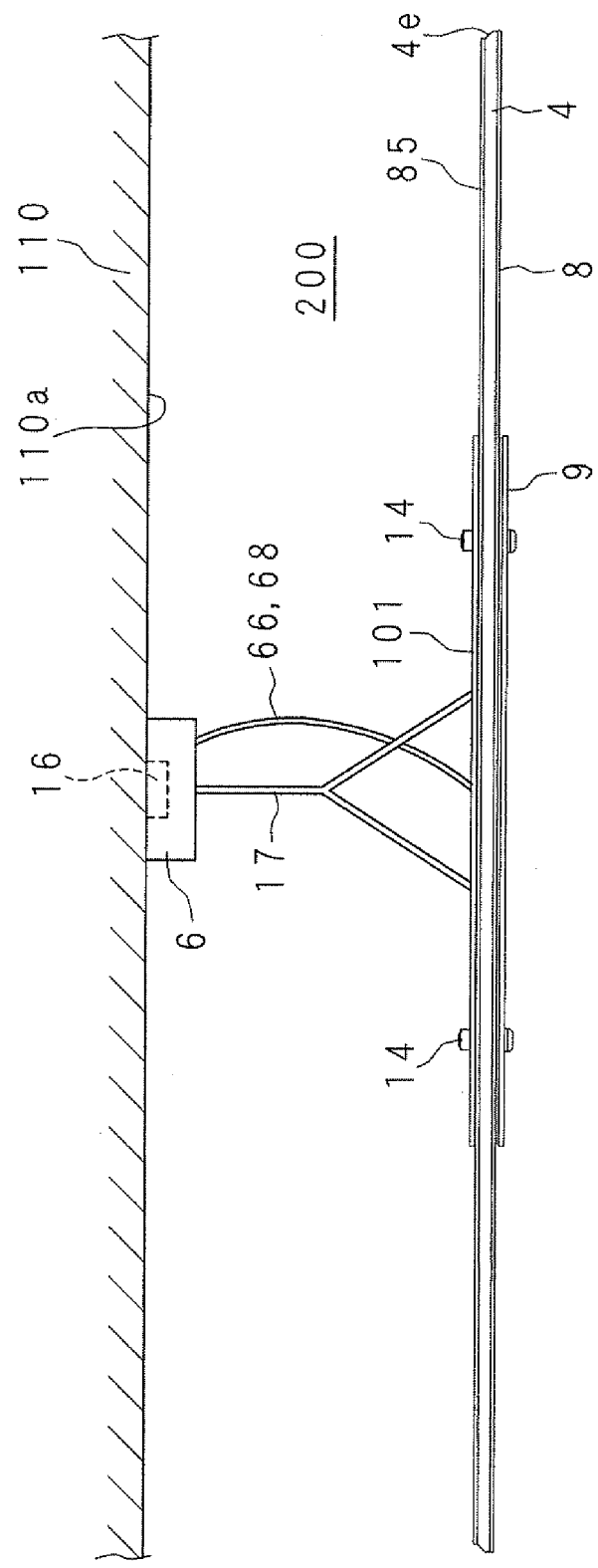
FIG. 9 illustrates an installation condition to the ceiling of a lighting apparatus in accordance with Embodiment 2.
Figure 10:
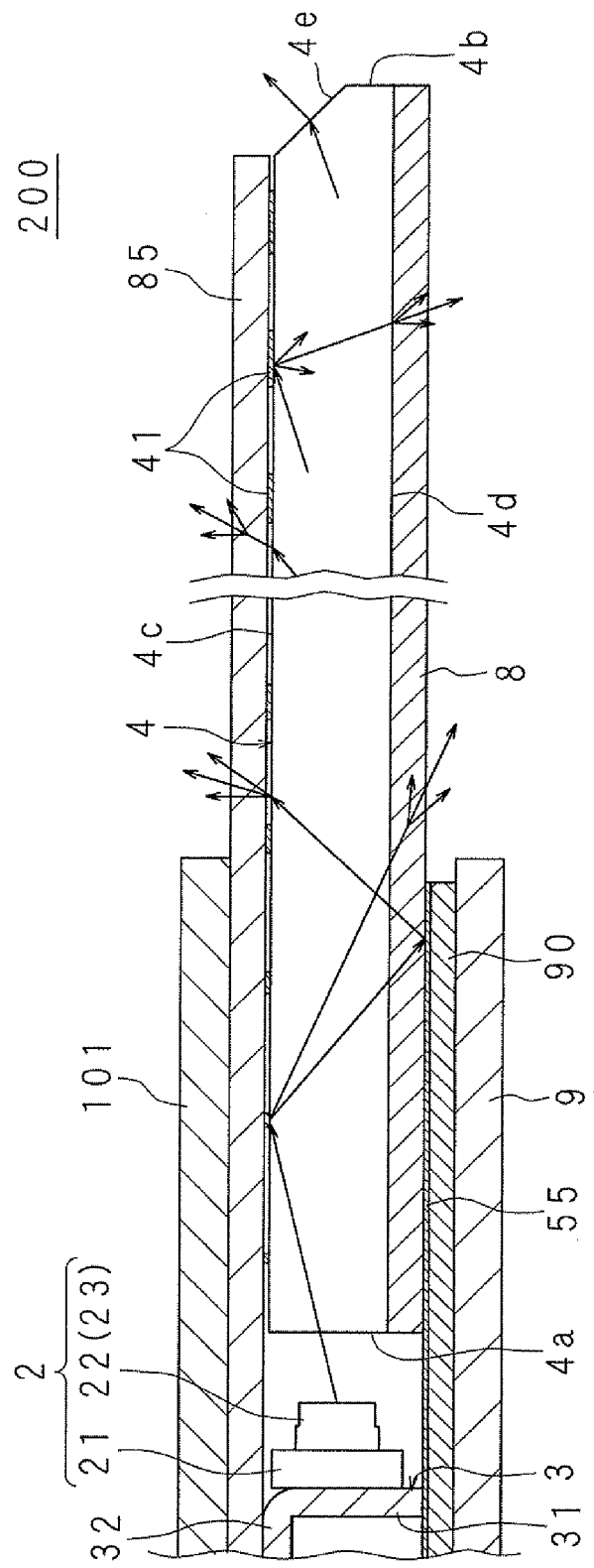
FIG. 10 is a local enlarged cross-sectional view of essential parts of the lighting apparatus in accordance with Embodiment 2.

FIG. 9 illustrates an installation condition to the ceiling of a lighting apparatus 200 in accordance with Embodiment 2. FIG. 10 is a local enlarged cross-sectional view of essential parts of the lighting apparatus 200 in accordance with Embodiment 2. With regard to the lighting apparatus 200 in accordance with the present embodiment, emission of light toward the top of the lighting apparatus 200 is increased as compared with the lighting apparatus 100 of the Embodiment 1.

A chassis 101 as an apparatus main body is formed into a disc shape whose diameter is substantially the same as the diameter of a center cover 9. The chassis 101 has a circular hole at the center portion, wires 66, 68 connecting a power supply section 6, LED modules 2 and a control substrate are inserted into the hole. The chassis 101 is made of metal such as iron or aluminum. The chassis 101 also functions as a heat sink for radiating heat generated in a heat radiator such as LED modules 2.

A diffusion plate 85 replaces the reflection sheet 5 described in Embodiment 1, the diffusion plate 85 is inserted between the chassis 101 and the light guiding plate 4. The diffusion plate 85 has the same shape as the reflection sheet 5 in Embodiment 1. The diffusion plate 85 is formed into a disc shape with an octagonal hole matching to the arrangement shape of the LED modules 2 at the center portion. The diffusion plate 85 is provided with a threaded hole such that the threaded hole aligns to the threaded hole of the chassis 101, in other words, the threaded hole aligns to the installation location of a light source holding section 3. When the light source holding section 3 is attached to the chassis 101, the diffusion plate 85 is carried on one surface of the chassis 101 in advance for aligning the threaded hole to the threaded hole of the chassis 101, and then the diffusion plate 85 is attached to the chassis 101 along with the light source holding section 3 through a threaded screw.

As similar to the chassis 1 described in Embodiment 1, the chassis 101 is fastened to the light source holding section 3 and the center cover 9 through a fastening member 14. The light source holding section 3 with the LED modules 2, the light guiding plate 4, the diffusion plate 85, the diffusion plate 8 and the like are pinched between the chassis 101 and the center cover 9 and these members are formed into an integrated body. Other elements identical to those described above with reference to Embodiment 1 illustrated in FIGS. 7 and 8 are designated with the same reference numerals and a detailed description thereof is omitted herein.

Even in the lighting apparatus 200 related to Embodiment 2 configured as described above, the LED module 2 is not arranged at the outer edge portion of the lighting apparatus 200, therefore, as similar to the lighting apparatus 100 related to Embodiment 1, the moment acting on the chassis 101 can be reduced. Therefore, the deformation of the chassis 101 is prevented and hence the reliability of the lighting apparatus 200 can be improved.

Even in the lighting apparatus 200 related to Embodiment 2, light is emitted toward the outer edge portion of light guiding plate 4 from the LED modules 2 provided at the central portion of the lighting apparatus 200, in other words, light is emitted toward the outer edge portion of the lighting apparatus 200 (chassis 101). Reflection dots 41 are provided at one surface 4c of the light guiding plate 4 such that size of area (large/small) of the reflection dot 41 of diffusing light emitted from the LED modules 2 corresponds to the distance (far/near) from the LED modules 2, therefore, a substantially uniform plane emission from the central portion to the outer edge portion can be achieved as similar to the lighting apparatus 100 in accordance with Embodiment 1.

In the lighting apparatus 200 in accordance with Embodiment 2, an inclined surface 4e inclined to the direction intersecting with the direction of light emission between outer peripheral surface 4b and one surface 4c of the light guiding plate 4, is formed across the whole circumference substantially, and the diffusion plate 85 is provided at the side of the one surface 4c of the light guiding plate 4. With regard to the light diffused by the reflection dots 41 of the light guiding plate 4, as shown by arrows in FIG. 10, a part of the light is reflected on the diffusion plate 8 and is incident on the one surface 4c of the light guiding plate 4. A part of the light among incident lights, which forms a larger angle with the one surface 4c, is radiated from the one surface 4c of the light guiding plate 4 without being reflected on the one surface 4c. The radiated light is diffused by the diffusion plate 85 and radiated to outside of the lighting apparatus 200.

As shown in FIG. 9, when the lighting apparatus 200 is installed in a ceiling 110, the light radiated from the diffusion plate 85 illuminates a ceiling surface 110a. The light radiated from the inclined surface 4e is to illuminate the ceiling surface 110a, wall surface of a room and the like as described in Embodiment 1. By providing the diffusion plate 85 along with the inclined surface 4e in the lighting apparatus 200 in accordance with Embodiment 2, the amount of light outputted to the top of the lighting apparatus 200 can be increased, therefore, the ceiling surface 110a, wall surface of a room and the like can be more brightly illuminated so that the user feels that an entire room is brighter.

With regard to the present embodiment, the diameter of the chassis 101 is substantially same as that of the center cover 9, however, the shape and dimension of the chassis 101 are not limited to this case. In other words, the increasing and decreasing of amount of light radiated to the top of the lighting apparatus 200 corresponds to the size of area of the one surface 4c of the light guiding plate 4 covered by the chassis 101, therefore, the shape and dimension of the chassis corresponding to the desired light distribution ratio of the top and bottom of the lighting apparatus may also be considered.

With regard to the present embodiment, the amount of light radiated to the top of the lighting apparatus 200 is increased by making the diameter of the chassis 101 smaller than that of the chassis 1 described in Embodiment 1, however, it is not only limited to this case. It can also be configured such that the permeability at the side of the one surface 4c of the light guiding plate 4 corresponds to the amount of light radiated to the top. For example, the chassis 101 may also be configured by the material having permeability corresponding to the amount of light radiated to the top. Moreover, a switching configuration may also be provided for opening and closing such as a lever to vary the light-permeable area, at the one surface 4c of the light guiding plate 4. For example, the material such as liquid crystal whose shape are changed by the voltage application may be utilized as the switching configuration. Additionally, a mechanical switch may also be configured as the switching configuration.

(Embodiment 3)

Figure 11:
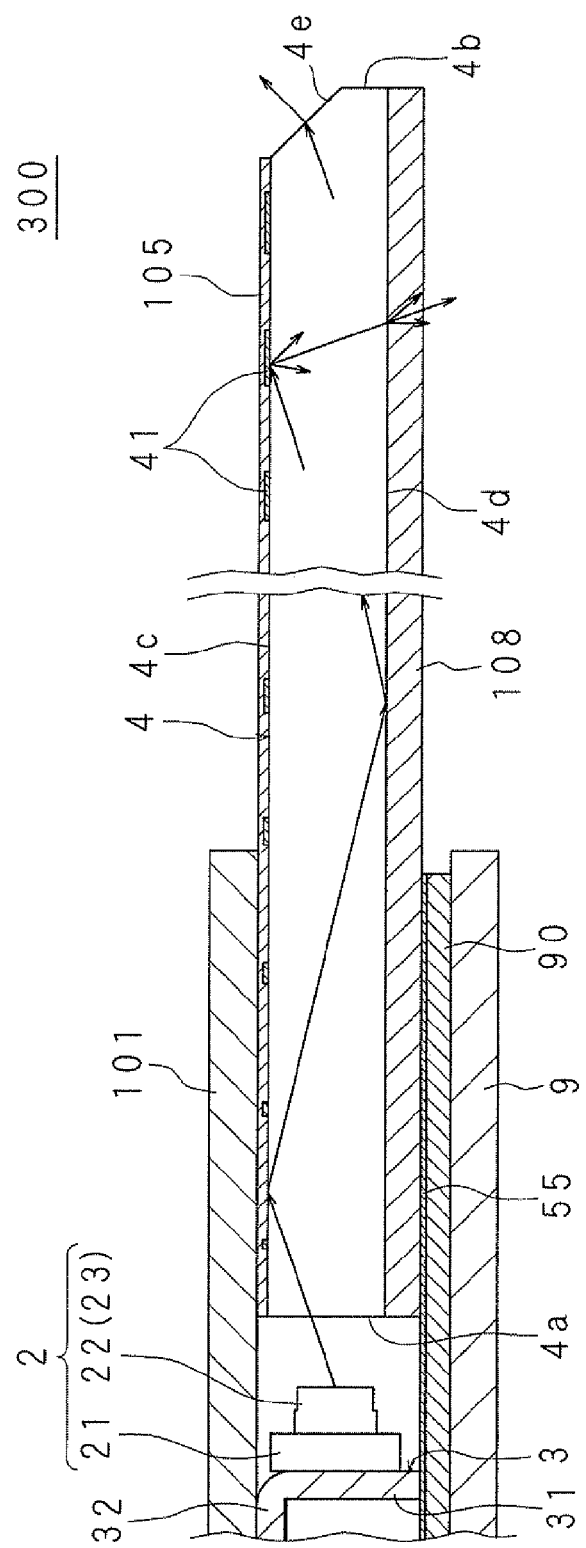
FIG. 11 is a local enlarged cross-sectional view of essential parts of a lighting apparatus in accordance with Embodiment 3.

FIG. 11 is a local enlarged cross-sectional view of essential parts of a lighting apparatus 300 in accordance with Embodiment 3. With regard to the present embodiment, a reflection layer 105 is formed on almost the entire region of one surface 4c of the light guiding plate 4 by applying paint made of a material different from the reflection dots 41, in replacement of the reflection sheet 5 inserted between the chassis 1 and the light guiding plate 4 in Embodiment 1. The reflection layer 105 has the same function as the reflection sheet 5 in Embodiment 1.

Additionally, with regard to the present embodiment, a diffusion layer 108 obtained by coating resin containing appropriate amount of diffusion material is formed on almost the entire region of the one other surface 4d of the light guiding plate 4, in replacement of the diffusion plate 8 in Embodiment 1. The diffusion layer 108 has the same function as the diffusion plate 8 in Embodiments 1 and 2.

As similar to the chassis 1 in Embodiment 1, the chassis 101 is fixed to a light source holding section 3 and a center cover 9 with a fastening member. The light source holding section 3 with LED modules 2, the light guiding plate 4 and the like are pinched between the chassis 101 and the center cover 9 and these members are formed into an integrated body. Other elements identical to those described above with reference to Embodiment 1 illustrated in FIG. 7 are designated with the same reference numerals and a detailed description thereof is omitted herein.

As shown in Embodiments 1 and 2, in a case where a reflection sheet, diffusion plate and the like are provided at the surface of a diffusion plate, the side of the central portion of the light guiding plate is clamped by a holding member including the chassis and the center cover 9 with a predetermined fastening force, therefore, the reflection sheet, the diffusion plate and the like are in close contact with the light guiding plate. On the other hand, the side of the outer edge portion of the light guiding plate is separated from the position held by the fastening member, therefore, a gap may be created among the reflection sheet, the diffusion plate and the light guiding plate. Therefore, in order to make the reflection sheet, the diffusion plate and the like a close contact with the surface of the light guiding plate, it is preferable to make separate fixing by using an adhesive agent, a fixing member and the like. However, when the outer edge portion of the lighting apparatus is fixed with a fixing member such as a clasp, a portion of the fixing member such as the clasp is not illuminated uniformly, the problem that the lighting apparatus becomes thickening and affects visual appearance may occur.

With regard to the present embodiment, the reflection layer 105 and the diffusion layer 108 are formed on the light guiding plate 4 through printing, coating and the like, therefore, it is possible to make the reflection layer 105 and the diffusion layer 106 close contact with the light guiding plate 4 without making a separate fixing through an adhesive agent, fixing member and the like. As a result, the chassis 101 is fastened to the light source holding section 3 and the center cover 9 with a fastening member, therefore, constructional members can be held securely without forming a gap among members configuring the lighting apparatus 300.

With regard to the lighting apparatus 300 in accordance with Embodiment 3 configured as described above, in addition to the effects described in the lighting apparatus 100 in accordance with Embodiment 1, each member for configuring the lighting apparatus can be held securely without making another separate fixing through an adhesive agent, fixing member and the like, therefore, the reliability of the lighting apparatus 300 can be improved.

With regard to the lighting apparatus in accordance with Embodiments 1 to 3, the chassis and the center cover 9 are configured for closing the central portion of the lighting apparatus. However, the lighting apparatus may also be configured such that the chassis and the center cover 9 are provided with a circular hole at the center portion and the outer appearance of the lighting apparatus may be formed into a so-called donut shape. As similar to the lighting apparatus in Embodiments 1 to 3, it is preferable to have a cavity at the central portion in the suspension type lighting apparatus suspended by a lifted device provided at the attaching member such as ceiling, that is, a so-called pendant light so that the user feels spacious.

(Embodiment 4)

Figure 12:
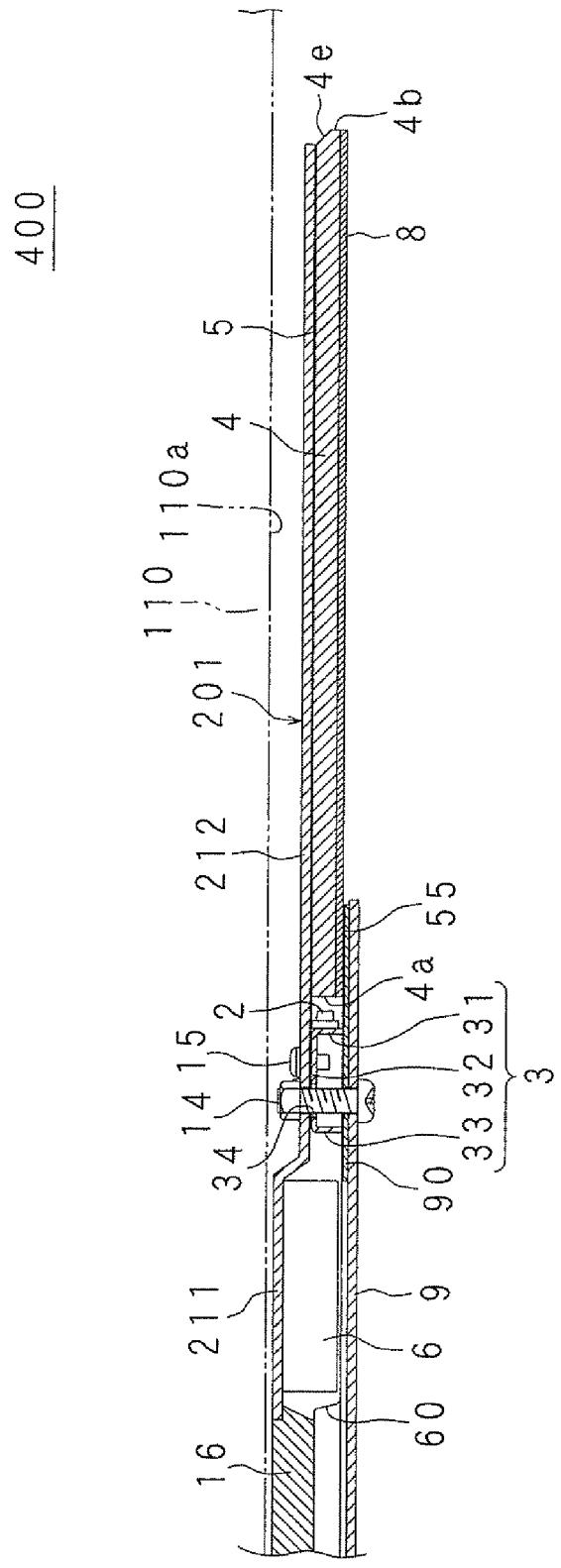
FIG. 12 is a schematic cross-sectional view of a lighting apparatus in accordance with Embodiment 4.

An example of a suspension type lighting apparatus suspended by a suspension tool provided from an attaching member such as ceiling, that is, a so-called pendant light is explained in all above embodiments. However, an attachment type lighting apparatus attached to an attaching member such as ceiling, that is, a so-called ceiling light can also be configured as similar to the above-mentioned embodiments. FIG. 12 is a schematic cross-sectional view of a lighting apparatus 400 in accordance with Embodiment 4, it illustrates an example of application to an attachment type lighting apparatus attached to an attaching member such as ceiling, that is, a so-called ceiling light. With regard to the lighting apparatus 400 related to Embodiment 4, a power supply section and an adaptor are housed in the cavity to be surrounded by the chassis, the light source holding section and the center cover of the lighting apparatus 100 related to Embodiment 1.

A chassis 201 as an apparatus main body is provided with a disc base 211 having a circular blind hole at the center, an annular section 212 connected to the outer edge portion of the base 211 in a crossing direction and having a broad annular shape parallel to the base 211. The chassis 201 is made of a metal such as iron or aluminum. Moreover, the chassis 201 functions as a heat sink radiating heat generated in a heat radiator such as a light source.

An adaptor 16 is attached to a circular hole of the base 211 of the chassis 201. The adaptor 16 forms a flat cylindrical shape. By engaging the hook blade to an engaging hole of an attaching body such as a suspended ceiling body provided at an attaching member such as the ceiling 110, the adaptor 16 is electrically and mechanically connected to the attaching body. The chassis 201 is attached to the adaptor 16 so that the adaptor 16 is connected and attached to the attaching body while the chassis 201 is attached to the ceiling 110 as the attaching member.

Figure 13:
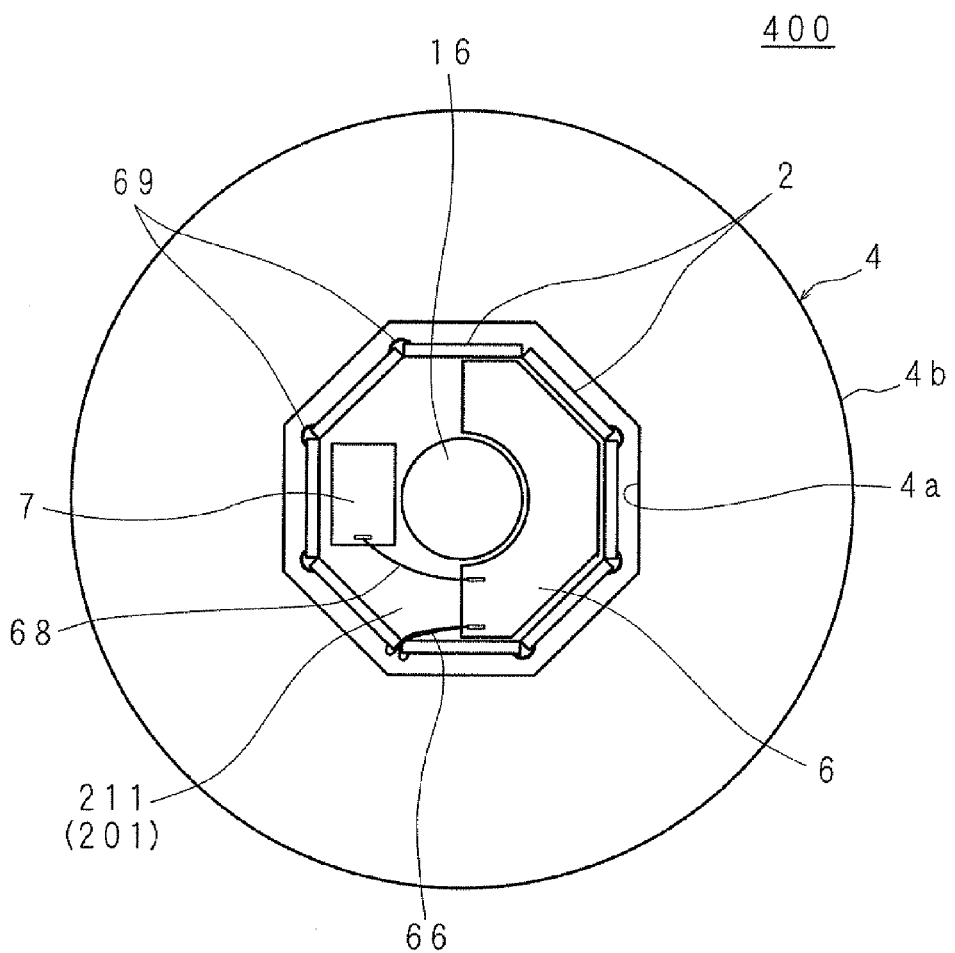
FIG. 13 illustrates an arrangement of a main part of the lighting apparatus in accordance with Embodiment 4.

FIG. 13 illustrates an arrangement of essential parts of the lighting apparatus 400 in accordance with Embodiment 4. The LED modules 2 as a light source are attached to the base 211 of the chassis 201 such that the LED modules 2 surround the periphery of the adaptor 16 through a light source holding section 3 in a radial direction.

A light guiding plate 4 as an optical control member is provided for controlling the direction of light emission from the LED modules 2, at the annular section 212 of the chassis 201. The reflection sheet 5 is inserted between the chassis 201 and the light guiding plate 4.

A power supply section 6 is provided with a C-shaped power supply substrate and electronic components such as a rectifier circuit mounted to the power supply substrate 61 that rectifies current supplied from an alternator (AC generator)

and a transformer transforming the rectified potential into a predetermined potential. The power supply section 6 is provided through a power supply substrate supporting section at the base 211 of the chassis 201 to be surrounded by the light source holding section 3.

A rectangular plate shaped control substrate 7 is provided via a control substrate supporting section at the opposite side of the power supply section 6 of the base 211 of the chassis 201 with respect to the adaptor 16 surrounded by the light source holding section 3. Electronic components (not shown) such as a control microcomputer, a dimmer control circuit are mounted on the control substrate 7.

The power supply section 6 is electrically connected through a wire 66 to the LED module 2. A wire 69 as a jumper cable is used for electrical connection between the LED modules 2. The power supply section 6 is electrically connected through a wire 68 to the control substrate 7.

The power supply section 6 and the control substrate 7 are housed in a cavity to be formed by the base 211 of the chassis 201 and the light source holding section 3, and the cavity is sealed by a substrate cover 60. The substrate cover 60 is provided with a disc-shaped cover having a circular hole at the center, and an annular section being parallel and connected to the cover.

As described above, the center cover 9 is attached to the chassis 201 to which the LED module 2, the power supply section 6, the control substrate 7 and the substrate cover 60 are attached. Other elements identical to those described above with reference to Embodiment 1 illustrated in FIGS. 4 and 5 are designated with the same reference numerals and a detailed description thereof is omitted herein.

The effects achieved in the lighting apparatus 100 related to Embodiment 1 are similar to the lighting apparatus 400 related to Embodiment 4 as described above.

Figure 14:
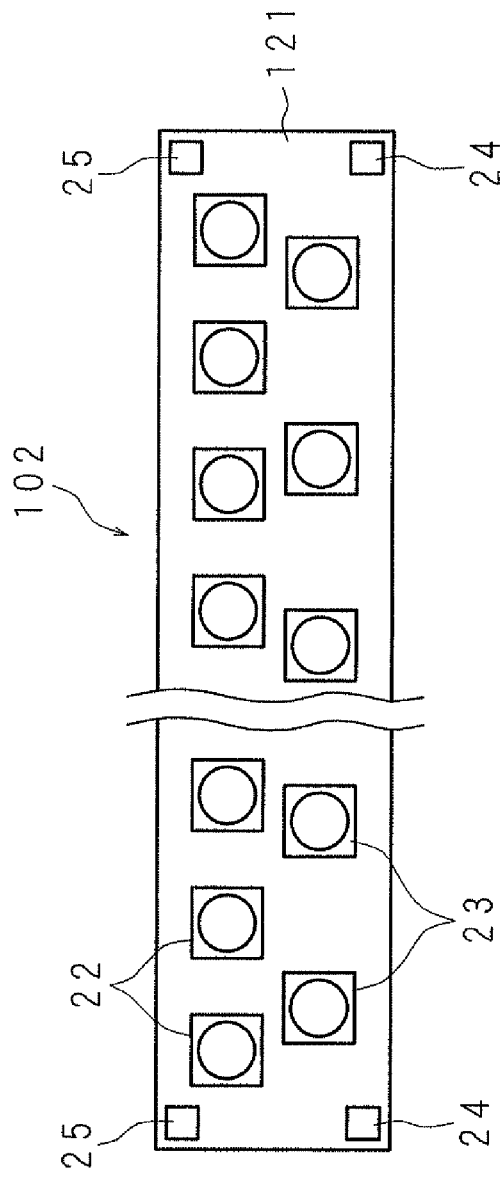
FIG. 14 is a schematic view illustrating an example of other applicable LED modules in the present invention.

In above-described embodiments, the LED module 2 in which light sources with different color temperatures (the daylight LED 22 and the incandescent LED 23) are mounted along the longer side of the LED substrate 21 such that the light emitting sections of the daylight LEDs 22 and the incandescent LEDs 23 are arranged on a substantially straight line is used as shown in FIG. 6, however, an applicable LED module is not limited to this case. For example, light sources with different color temperatures (the daylight LED 22 and the incandescent LED 23) may be arranged in parallel. FIG. 14 is a schematic view illustrating an example of another applicable LED module 102 in the present invention.

As shown in FIG. 14, the LED module 102 is provided with a rectangular plate shaped LED substrate 121, a plurality of daylight LEDs 22 emitting quasi-daylight serially mounted along the long side of the LED substrate 121, and a plurality of incandescent LEDs 23 emitting incandescent light serially mounted along the long side of the LED substrate 121 parallel to the daylight LEDs 22. The LED substrate 121 is made of a metal such as iron or aluminum, and it functions as a heat conductor conducting heat generated in the daylight LED 22 and the incandescent LED 23 to the light source holding section 3. Moreover, it is preferable that the LED substrate 121 is made of iron, because the coefficient of thermal expansion of iron is close to that of the resin of the daylight LED 22 and the incandescent LED 23.

A first connecting section 25 is arranged on both ends of a circuit pattern (not shown) for power supply in which the plurality of daylight LEDs 22 are connected in series. Similarly, a second connecting section 24 is arranged on both ends of a circuit pattern for power supply in which the plurality of incandescent LEDs 23 are connected in series. Moreover, with regard to the connection between the plurality of LED modules 102, these first connecting section 25 and second connecting section 24 are connected to each other by wires 69 as jumper cables through soldering as similar to the LED modules 2.

In a case where light sources with different color temperatures (the daylight LED 22 and the incandescent LED 23) are arranged in parallel like the LED modules 102, it is necessary to devise a configuration such that the light emitted from the LED modules 102 is efficiently incident on the light guiding plate. Firstly, making the thickness of a light guiding plate larger is considered for matching to the arrangement of LEDs, however, the lighting apparatus becomes heavier and may lose its aesthetics as making the light guiding plate thicker uniformly.

For example, a method for providing a condensing lens at the vicinity of the light emitting sections of LEDs and collecting the light emitted from the LEDs at the peripheral surface of the light guiding plate may be utilized without changing the thickness of the light guiding plate. Also, a method for making the optical axes of one side of LEDs (e.g., the daylight LED 22) align to the center of the light guiding plate in the depth-wise direction and providing a reflection member for reflecting the light emitted from the other side of LEDs (the incandescent LED 23) and causing the light to be incident on the peripheral surface of the light guiding plate may be utilized without changing the thickness of the light guiding plate. Moreover, a method for tilting the LEDs toward the light guiding plate and facilitating the light emitted from the LEDs to be incident on the peripheral surface of the light guiding plate may be utilized without changing the thickness of the light guiding plate. Furthermore, a method for devising the shape of the light guiding plate to facilitate the light emitted from the LED modules 102 to be incident on the light guiding plate may also be utilized.

Figure 15:
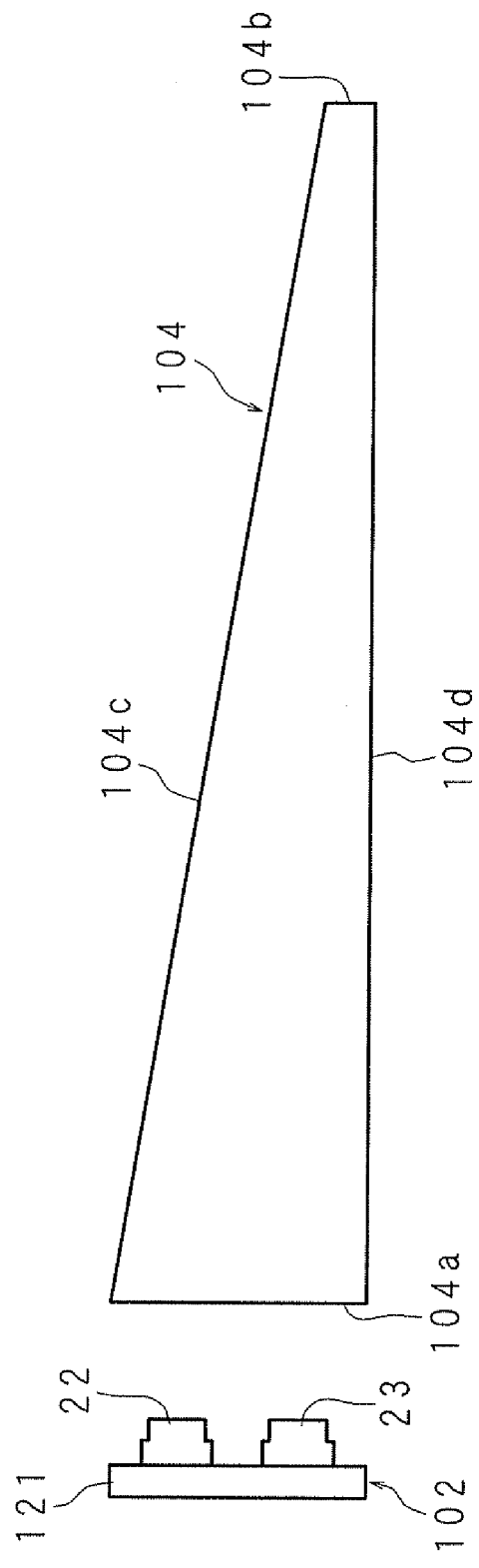
FIG. 15 is a schematic view illustrating an example of other applicable light guiding plate in the present invention.
Figure 16:
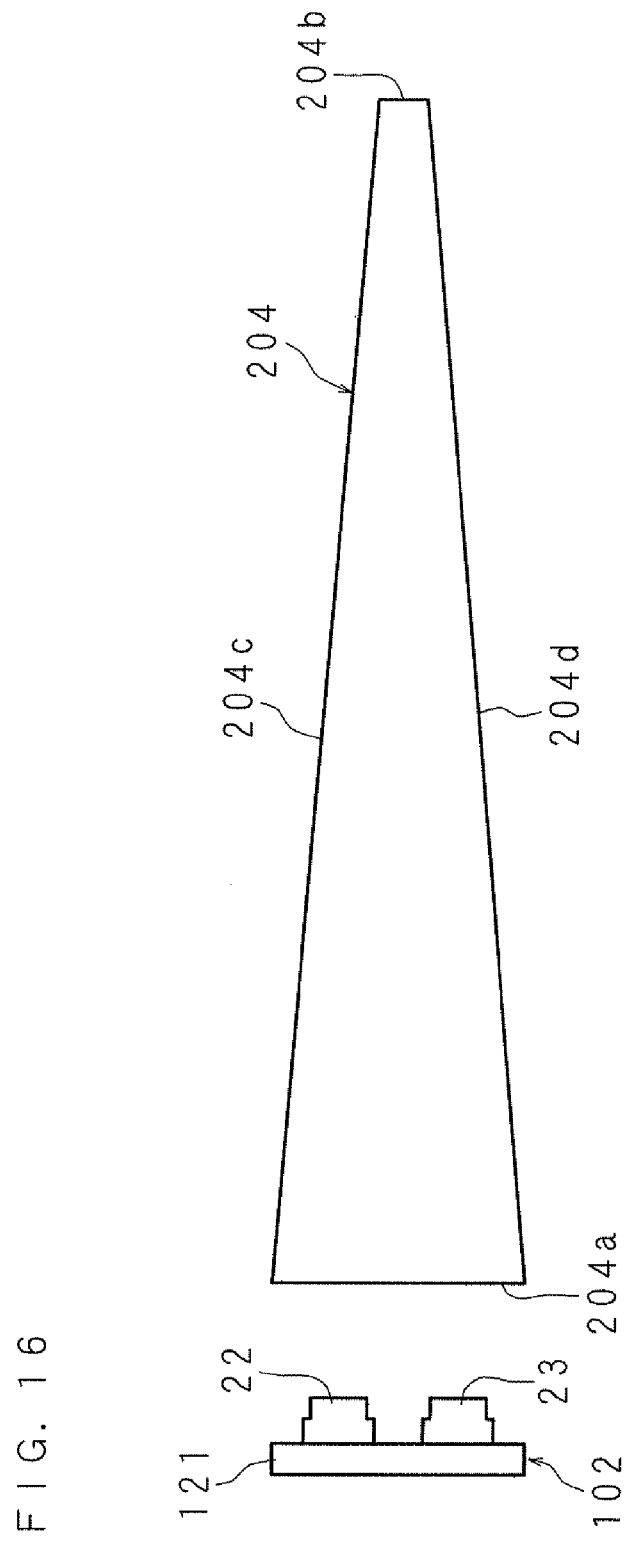
FIG. 16 is a schematic view illustrating an example of other applicable light guiding plate in the present invention.

FIGS. 15 and 16 are schematic views illustrating an example of other applicable light guiding plate in the present invention. The light guiding plate shown in FIGS. 15 and 16 is formed such that the change in thickness (decrease/increase) corresponds to the distance (far/near) from the LED modules 102. The light emitted from the LED modules 102 is easily incident on the light guiding plate by making the thickness of the light guiding plate 4 close to the LED modules 102 larger than the gap between the light emitting section of the daylight LED 22 and the light emitting section of the incandescent LED 23 of the LED module 102.

The light guiding plate 104 shown in FIG. 15 is formed into a disc shape with an octagonal hole matching to the arrangement shape of the LED modules 102 at the center. The light guiding plate 104 includes a peripheral surface 104a of the hole parallel to an LED substrate 121 of the LED module 102, an outer peripheral surface 104b parallel to the peripheral surface 104a, one surface 104c connecting the peripheral surface 104a and the outer peripheral surface 104b, and the one other surface 104d. The light guiding plate 104 is formed such that the thickness is getting smaller continuously from the central portion to the outer edge portion by inclining outwardly the one surface 104c of the light guiding plate 10.

The light guiding plate 204 shown in FIG. 16 is formed into a disc shape with an octagonal hole matching to the arrangement shape of the LED modules 102 at the center. The light guiding plate 204 includes a peripheral surface 204a of the hole parallel to an LED substrate 121 of the LED module 102, an outer peripheral surface 204b parallel to the peripheral surface 204a, one surface 204c connecting the peripheral surface 204a and the outer peripheral surface 204b, and the one other surface 204d. The light guiding plate 204 is formed such that the thickness is getting smaller continuously from the central portion to the outer edge portion by inclining the one surface 204c and the one other surface 204d in the direction of the one surface 204c and the one other surface 204d being adjacent to each other.

The light guiding plates 104, 204 are attached to the chassis such that the one surfaces 104c and 204c are at the side of the chassis. Additionally, reflection dots are formed on the one surfaces 104c, 204c of the light guiding plate.

As described above, the light guiding plates 104, 204 are formed such that the change in thickness (decrease/increase) corresponds to the distance (far/near) from the LED modules 102. The LED module 102 is arranged oppositely to the light guiding plates 104, 204, and the thickness of the peripheral surfaces 104a, 204a of the lighting guiding plates 104, 204 on which the light from the LED module 102 is incident is larger than the gap between the light emitting section of the daylight LED 22 and the light emitting section of the incandescent LED 23 of the LED module 102, therefore, the amount of light not incident on the light guiding plates 104, 204 can be reduced. Therefore, the optical usage efficiency, that is, the equipment efficiency of an entire lighting apparatus can be improved.

Moreover, the light sources with different color temperature (the daylight LED 22 and the incandescent LED 23) are arranged in parallel, the gap between adjacent LEDs can be ensured as compared with the case where light sources are arranged in a series. Hence, the heat radiated from the LEDs is easy to be conducted to the chassis through the light source holding section 3. While keeping the gap between the adjacent LEDs in an appropriate distance, the chassis for placing the LED modules in a radial position approaches to the center of the lighting apparatus and hence the non-illumination region can be narrower. Hence, it is possible to broaden the illumination region.

The light guiding plates 104, 204 can also be applied to the LED modules 2. The light guiding plate is formed such that the change in thickness (decrease/increase) corresponds to the distance (far/near) from the LED module. The light emitted from the LED modules and being incident from the peripheral surface of the light guiding plate forms an angle with the one surface and/or the one other surface of the light guiding plate. The angles are different according to a radial position of the light guiding plate so that it is possible to broaden the light distribution emitted from the lighting apparatus without using a diffusion plate.

For example, in a case where the light guiding plate 204 is used, the angle formed between the incident light and the one surface 204c and/or the one other surface 204d of the light guiding plates 204 becomes smaller at the side of the central portion of the light guiding plate 204, therefore, total reflection occurs frequently. On the other hand, as the angle formed between the incident light and the one surface 204c and/or the one other surface 204d of the light guiding plate 204 becomes larger at the side of the outer edge portion of the light guiding plate 204, light transmission without total reflection occurs frequently. Then, the intensity (low/high) of the light emitted from the LED modules corresponds to the distance (far/near) from the LED modules. Reflection dots for diffusing light are provided at the one surface 204c, therefore, the luminance flux diffused by the one surface 204c of the light guiding plate 204 and emitted from the one surface 204c and/or the one other surface 204d is possible to be equal across a substantially entire region of the light guiding plate by configuring the area and/or number of the reflection dots. Hence, a substantially uniform plane emission can be achieved.

A rectangular plate shaped LED substrate is used in above embodiments, however, a flexible substrate may also be used.

Figure 17:
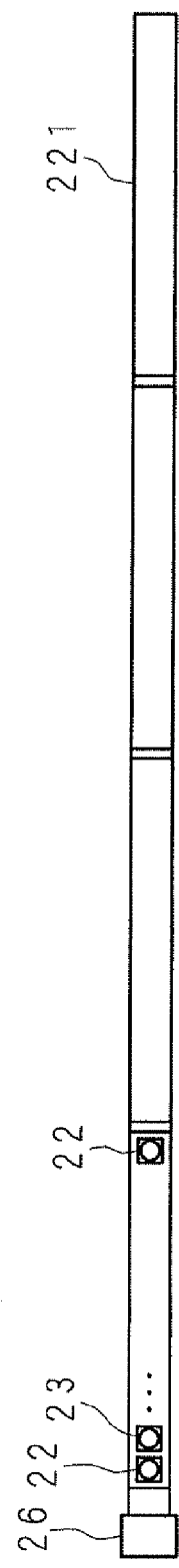
FIG. 17 is an explanatory view of an applicable flexible substrate in the present invention.
Figure 18:
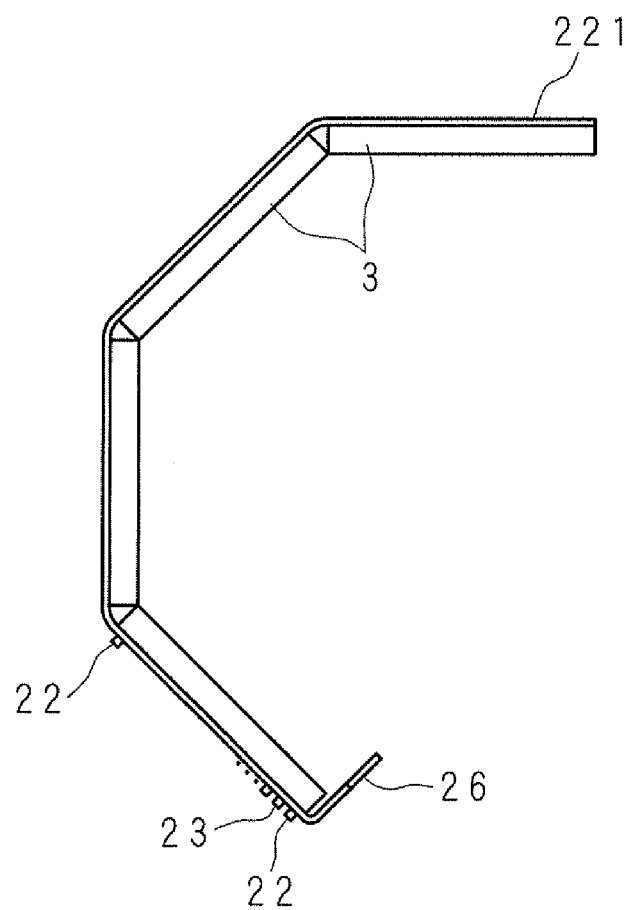
FIG. 18 is an explanatory view of the applicable flexible substrate in the present invention.

FIGS. 17 and 18 are explanatory views of the applicable flexible substrate 221 in the present invention.

The flexible substrate 221 is formed into a rectangular sheet shape with flexibility as shown in FIG. 17. The flexible substrate 221 has multiple LED installation regions in which LEDs are installed, and includes a connecting section 26 connected to a power supply section 6 at one end in the longitudinal direction. As similar to the LED substrates 21, 121, the daylight LEDs 22 and the incandescent LEDs 23 are mounted on each LED installation region. The flexible substrate 221 has four LED installation regions as shown in FIG. 17. Two flexible substrates 221 are used as apply to the before-mentioned lighting apparatus.

The flexible substrate 221 on which the daylight LEDs 22 and the incandescent LEDs 23 are mounted is adhered to the light source holding section 3 in the bending condition along the light source holding section 3 arranged in a substantially octagonal shape (only a half of a substantially octagonal shape shown in the figure). In a case where the flexible substrate 221 is used, the fixing region in which a threaded screw is applied becomes unnecessary and hence the gap between the adjacent LEDs can be ensured. Therefore, the heat radiated from the LEDs is conductible to the chassis through the light source holding section 3.

The LED modules are easy to be arranged in circular shape by using the flexible substrate 221, the gap between the adjacent LEDs can be made into a substantially same spacing. Therefore, the occurrence of light emission irregularity can be reduced.

A through hole as an octagonal hole matching to the arrangement of the LED modules is provided in all above embodiments, however, the hole is not limited to a through hole. For example, the hole may also be a concavity. The hole may be formed such that a peripheral surface is arranged opposite to the LED modules in order that the LED modules can emit light toward the outer edge portion of the light guiding plate.

With regard to the above embodiments, the chassis functions as a holding member for holding the LED modules, the light holding section, the light guiding plate, the reflection sheet, the diffusion plate and the like. Additionally, the chassis functions as a heat sink for radiating heat generated in the heat radiator such as the LED modules. However, a holding member and a heat sink may be provided separately.

With regard to the above embodiments, the reflection dots are provided as the reflection section. However, it is not limited to this case. Any elements configured for diffusing light may also be used. For example, a ring-shaped groove concentric with the light guiding plate may be provided such that the groove width and/or depth are varied with respect to the distance from the light source. Also, an hemispherical concavity may be provided in replace of the reflection dots.

With regard to the above embodiments, the light guiding plate is used as an optical control member for controlling the direction of light emission from the light source. However, it is not limited to this case. A lens and reflection member may also be used as the optical control member. An example of using the optical control member other than the light guiding plate is explained below.

(Embodiment 5)

Figure 19:
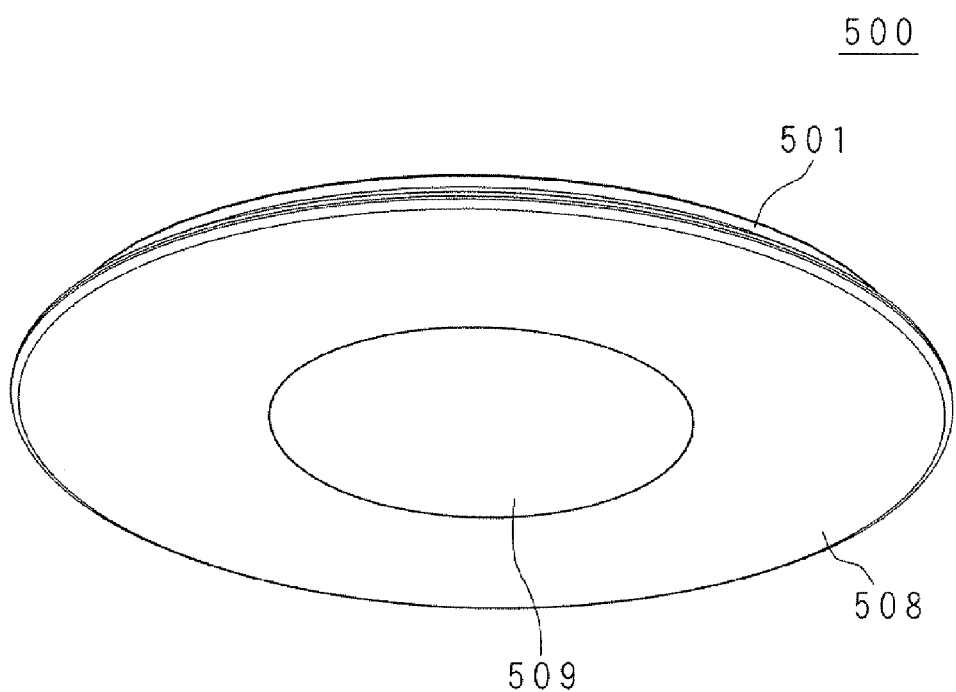
FIG. 19 is a schematic outline perspective view of a lighting apparatus in accordance with Embodiment 5.
Figure 20:
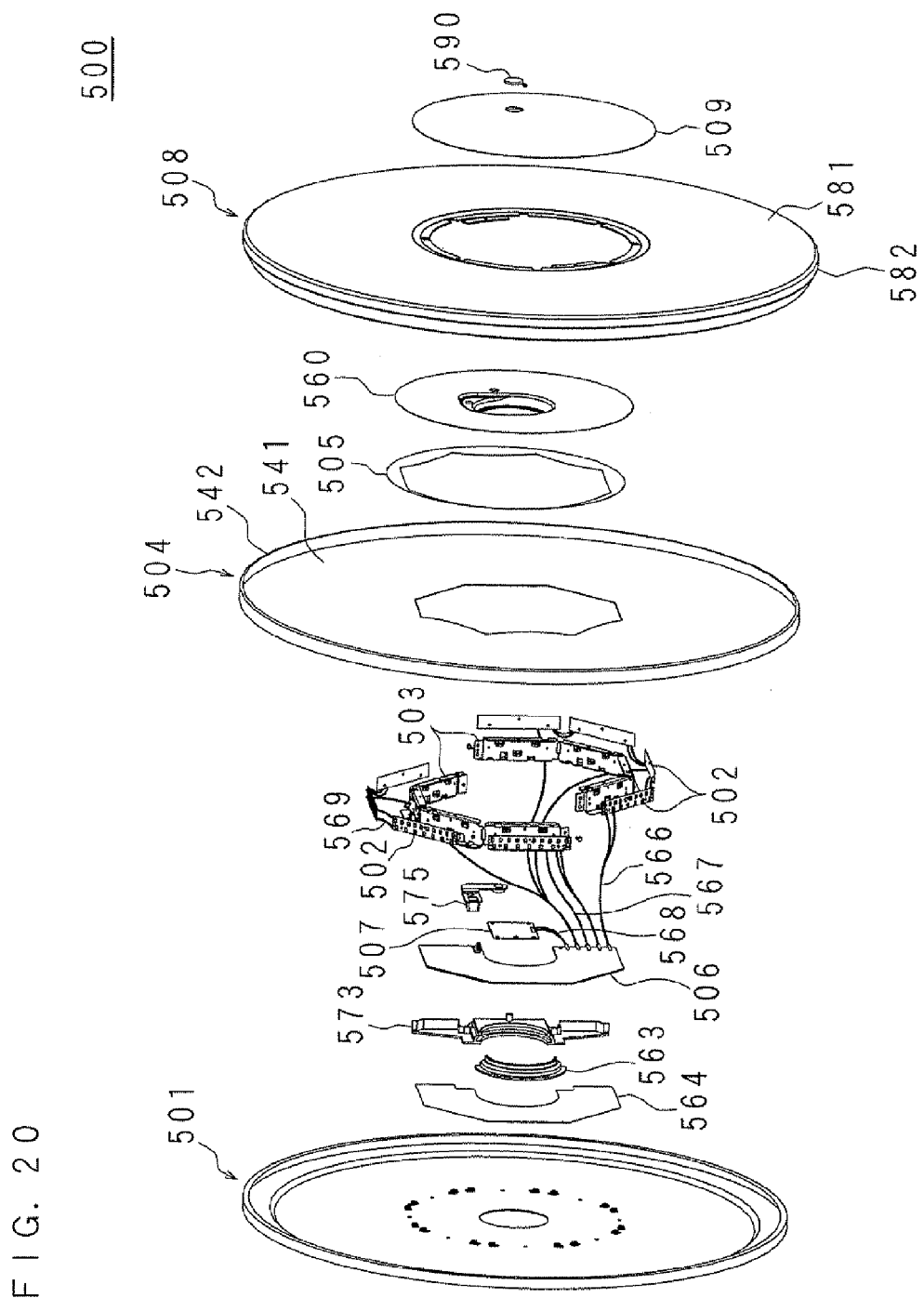
FIG. 20 is a schematic exploded perspective view of the lighting apparatus in accordance with Embodiment 5.
Figure 21:
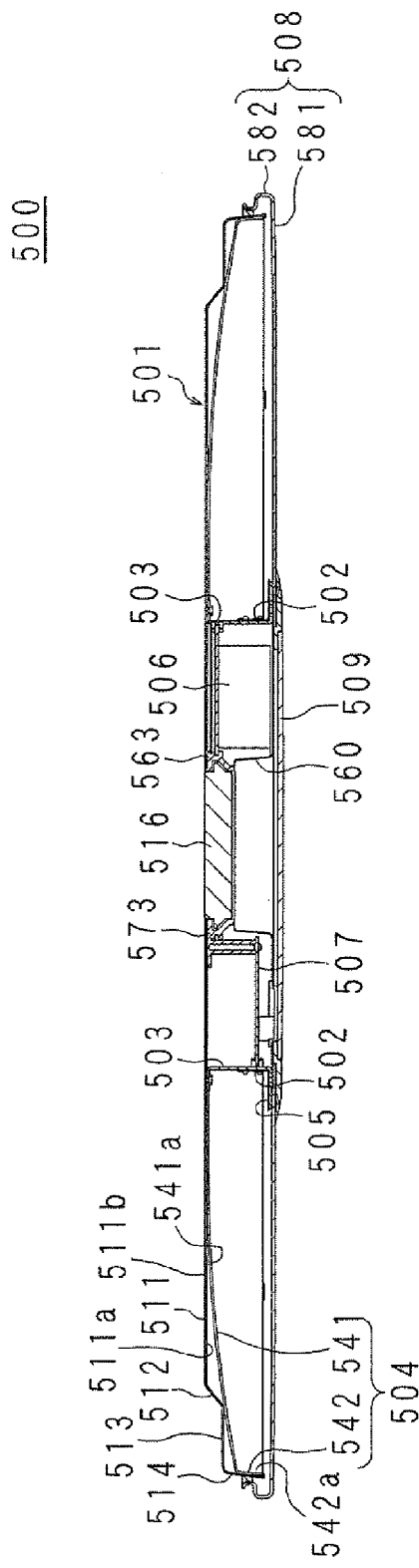
FIG. 21 is a schematic cross-sectional view of the lighting apparatus in accordance with Embodiment 5.
Figure 22:
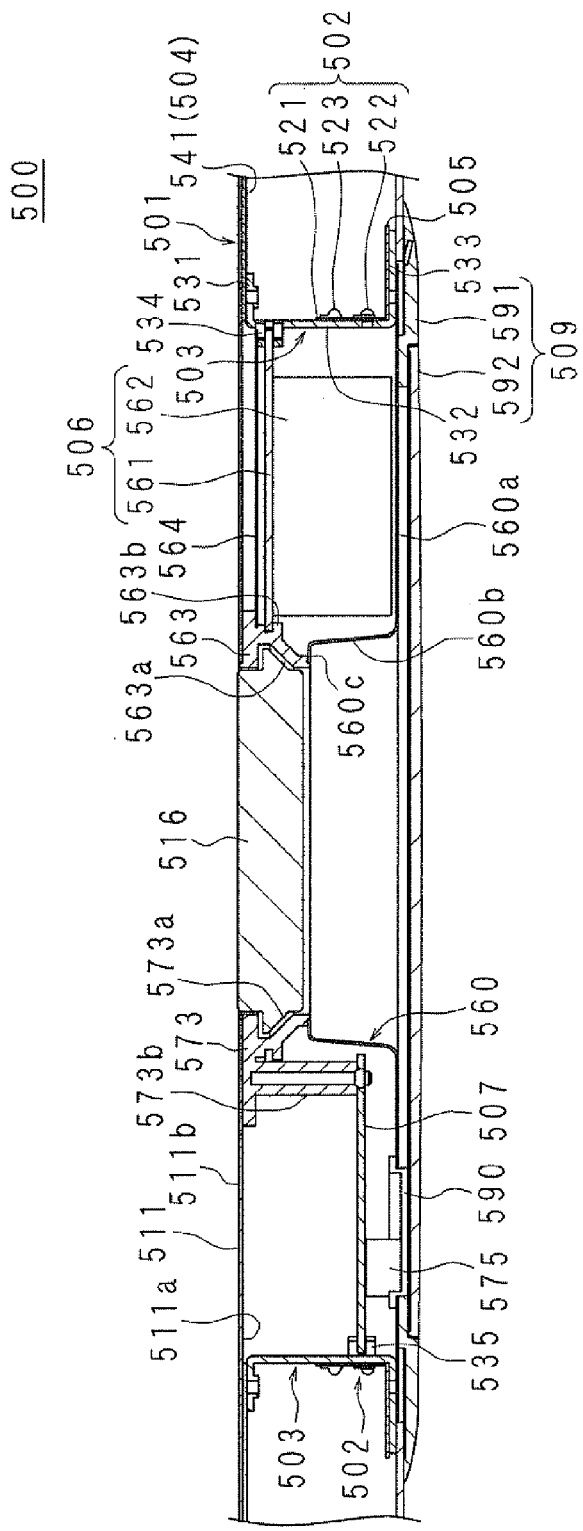
FIG. 22 is a schematic cross-sectional view of the central portion of the lighting apparatus in accordance with Embodiment 5.

FIG. 19 is a schematic outline perspective view of a lighting apparatus 500 in accordance with Embodiment 5 of the present invention. FIG. 21 is a schematic exploded perspective view of the lighting apparatus 500 in accordance with Embodiment 5. FIG. 22 is a schematic cross-sectional view of the lighting apparatus 500 in accordance with Embodiment 5. FIG. 22 is a schematic cross-sectional view of the central portion of the lighting apparatus 500 in accordance with Embodiment 5, that is, a local enlarged view of FIG. 21.

Numeral reference 501 in figures is a chassis as an apparatus main body for holding a light source described below. The chassis 501 is provided with a disc base 511 having a circular blind hole at the center, a connecting section 512 connected to the outer edge portion of the base 511 in a crossing direction, an annular section 513 having a broad annular shape parallel to the base 511 and connected to the outer edge portion of the connecting section 512, and a peripheral wall 514 vertically arranged at the annular section 513. The chassis 501 forms a shallow bowl shape. The chassis 501 is made of a metal such as iron or aluminum. Moreover, the chassis 501 functions as a heat sink radiating heat generated in a heat radiator such as a light source.

An adaptor 516 is attached to the blind hole of the base 511 of the chassis 501. The adaptor 516 forms a flat cylindrical shape. The adaptor 516 is provided with a hook blade engaging to an engaging hole of an attaching body such as a suspended ceiling body and the like to be attached to an attaching member at one end side, and a connector connected to a power supply section. By engaging the hook blade to the engaging hole of the attaching body, the adaptor 516 is electrically and mechanically connected to the attaching body. The chassis 501 is attached to the adaptor 516 so that the adaptor 516 is connected and attached to the attaching body while the chassis 501 is attached to ceiling as an attaching member. The adaptor 516 is a well-known art, therefore, the detailed explanation is omitted.

Figure 23:
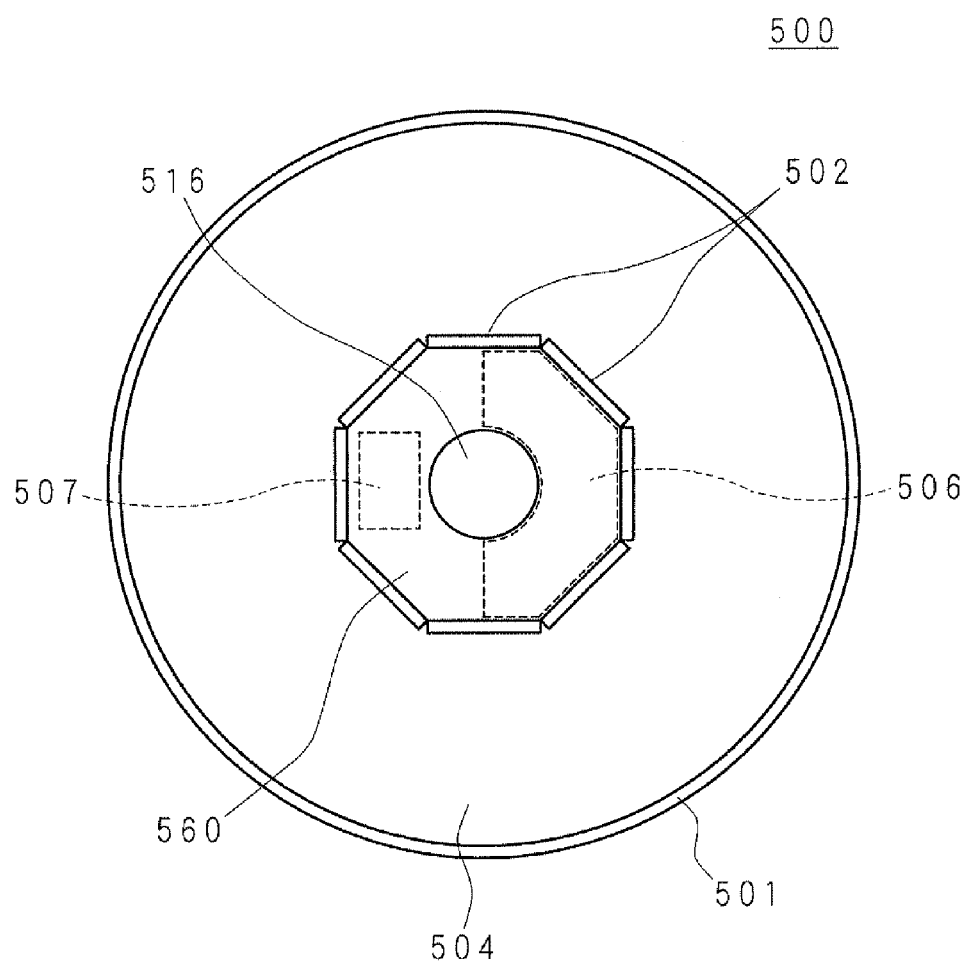
FIG. 23 illustrates an arrangement of essential parts of the lighting apparatus in accordance with Embodiment 5.
Figure 24:
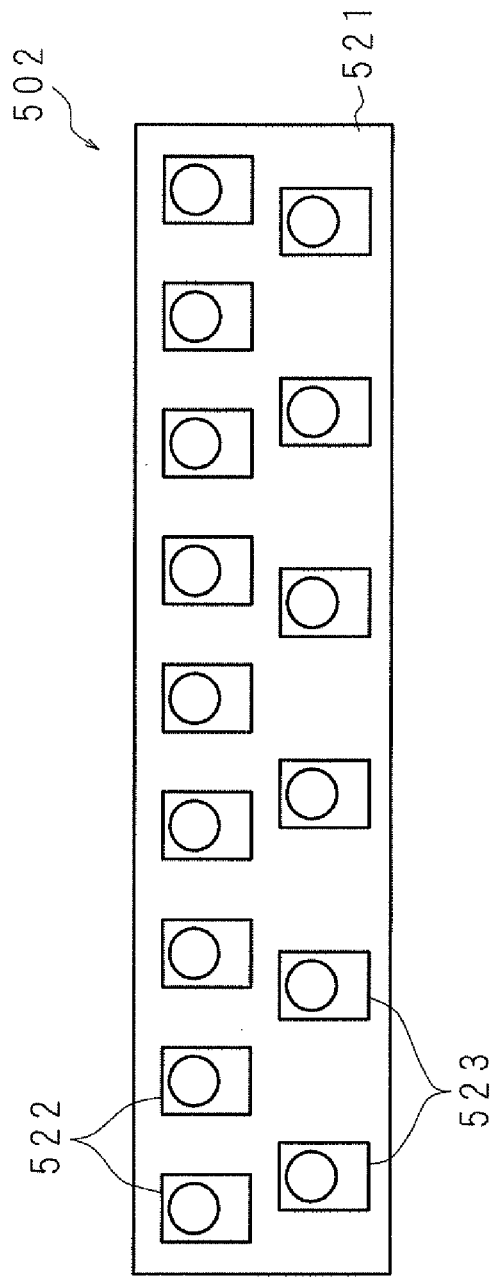
FIG. 24 is a schematic view of an LED module of the lighting apparatus in accordance with Embodiment 5.

LED modules 502 as a light source are attached to one surface 511a of the base 511 of the chassis 501 such that the LED modules 502 surround the periphery of the adaptor 516 through a light source holding section 503 in a radial direction. FIG. 23 illustrates an arrangement of essential parts of the lighting apparatus 500 in accordance with Embodiment 5. FIG. 24 is a schematic view of the LED module 502 of the lighting apparatus 500 in accordance with Embodiment 5.

As shown in FIG. 24, the LED module 502 is provided with a rectangular plate shaped LED substrate 521, a plurality of daylight LEDs 522 emitting quasi-daylight serially mounted along the long side of the LED substrate 521, and a plurality of incandescent LEDs 523 emitting incandescent light serially mounted along the long side of the LED substrate 521 parallel to the daylight LEDs 522. The daylight LED 522 and the incandescent LED 523 are surface mount type LED including, for example, an LED element, a sealing resin in which phosphors are scattered covering the LED element, an input terminal, and an output terminal. The LED substrate 521 is made of a metal such as iron or aluminum, and it functions as a heat conductor conducting heat generated in the daylight LED 522 and the incandescent LED 523 to the light source holding section 503. Moreover, it is preferable that the LED substrate 521 is made of iron, because the coefficient of thermal expansion of iron is close to that of the resin of the daylight LED 522 and the incandescent LED 523.

In the present embodiment, the daylight LEDs 522 are arranged on the LED substrate 521 such that the space between the neighboring daylight LEDs 522 is substantially the same. However, it is preferable that the space between the neighboring daylight LEDs 522 gradually becomes closer from the center of the long side of the LED substrate 521 toward the end. The arrangement of the incandescent LEDs 523 is also similar to that of the daylight LEDs 522. As similar to the present embodiment, in a case where the plurality of LED modules 522 are arranged in multangular shape, increasing darkness at the boundary division between neighboring LED modules 502 can be prevented, the light from the LED module 502 exits uniformly in order that the difference of luminance does not occur corresponding to positions in peripheral direction. Moreover, in a case where the LED modules are arranged roundly on a flexible substrate and the like, it is preferable that the LED modules are arranged such that the space between neighboring LEDs is substantially the same as similar to the present embodiment.

The U-shaped cross-sectional light source holding section 503 is provided with a rectangular holding plate 532 attached to the LED module 502, a fixing section 531 vertically arranged on one end of the long side of the holding plate 532 and fixed to the base 511 of the chassis 501, a holding section 533 provided at the other side of the long side of the holding plate 532 (the opposite side of the fixing section 531) with facing to the fixing section 531 in a parallel manner and holding a center cover as a power supply cover covering the later-mentioned power supply section, an engaging nail 534 holding a later-mentioned power supply substrate, and an engaging nail 535 holding a later-mentioned control substrate. The holding plate 532 is fixed to the non-mounting surface (the surface opposite to the mounting surface mounted by the daylight LED 522 and the incandescent LED 523) of the LED substrate 521 of the LED module 502 such that the long side of the LED substrate 521 corresponds to that of the holding plate 532 and that the daylight LED 522 is attached at the side of the holding section 533 (the farther side with respect to the reflection sheet 504 in the state of being attached to the chassis 501). The light source holding section 503 is made of a metal such as aluminum, it also functions as a heat conductor conducting heat generated in the LED module 502 as a heat radiator to the chassis 501 functioning as a heat sink.

The light source holding section 503 is substantially equally distributed at the base 511 of the chassis 501 in a circumferential direction and fixed to the fixing section 531 such that the surface of the holding plate 532 attached by the LED module 502 faces to the outer edge of the chassis 501, and an octagonal peripheral wall is formed by the holding plates 532. Moreover, the adjacent light source holding sections 503 are coupled and fixed by thread and the like. In this way, the light source holding section 503 is attached to the chassis 501, the LED module 502 is supported such that the LED substrate 521 crosses the chassis 501 at a substantially right angle in a radial direction. As shown in FIG. 23, the LED modules 502 are arranged in an octagon shape on the chassis 501. When the LED module 502 is lighted up, the light emitted from the LED module 502 is radiated in a radial manner to the direction from the central portion of the base 511 of the chassis 501 to the outer edge portion.

The reflection sheet 504 as the reflecting section for reflecting light emitted from the LED module 502 is provided at the chassis 501. The reflection sheet 504 is provided with a disc portion 541 having an octagonal hole corresponding to the arrangement shape of the LED module 502 at the center, and a peripheral wall 542 vertically arranged at the outer periphery of the disc portion 541. The disc portion 541 faces to the outer edge portion from the center, and the side of the one surface 541a is bended in a gradual manner that gradually forms concavity. The reflection sheet 504 is made of resin, and the processing is applied to the surface of the reflection sheet 504 for making diffused reflection easily. The convex side of the reflection sheet 504, that is, the surface at the opposite side of the one surface 541a is attached to the chassis 501 such that the surface is at the side of the chassis 501. In the condition of attaching, the peripheral wall 542 of the reflection sheet 504 is separated from the LED module 502 and opposite to the LED module 502, therefore, the inner circumferential surface 542a of the peripheral wall 542 is separated from the direction of light emission from the LED module 502, and becomes a reflection surface opposite to the direction of light emission from the LED module 502.

A top plate reflection sheet 505 as another reflecting section for reflecting light emitted from the LED module 502 to the side of the reflection sheet 504 is provided at the inner surface of the holding section 533 of the light source holding section 503. The top plate reflection sheet 505 is made of a disc-shaped resin having an octagonal hole matching to the arrangement shape of the LED module 502 at the center. The processing is applied to the surface of the top plate reflection sheet 505 for making diffused reflection easily. By fixing the top plate reflection sheet 505 to the inner surface of the holding section 533 of the light source holding section 503, the top plate reflection sheet 505 is attached to the opposite side of the reflection sheet 504 with respect to the LED module 502.

A power supply section 506 is provided with a C-shaped power supply substrate 561 and electronic components 562 such as a rectifier circuit mounted to the power supply substrate 561 that rectifies current supplied from an alternator (AC generator), a transformer transforming the rectified potential into a predetermined potential. The power supply section 506 is provided through a power supply substrate supporting section 563 at the base 511 of the chassis 501 to be surrounded by the light source holding section 503. The power supply supporting section 563 forms a plane-viewed half ring shape and is attached to the peripheral edge portion of the attaching hole of the base 511 of the chassis 501. An engaging concavity 563a engaging to the adaptor 516 is formed on the inner surface of the power supply substrate supporting section 563. A clamp section 563b clamping the power supply substrate 561 of the power supply section 506 is provided on the outer surface of the power supply substrate supporting section 563. The base 511 of the chassis 501 supports the power supply section 506 in such a manner that the power supply substrate 561 is clamped by the engaging nail 534 of the light source holding section 503 and the clamp section 563 of the power supply substrate holding section 563. An insulation sheet 564 is supported by the light source holding section 503 and the power supply substrate supporting section 563 between the power supply section 506 and the base 511 of the chassis 501.

A rectangular plate shaped control substrate 507 is provided via a control substrate supporting section 573 at the opposite side of the power supply section 506 of the base 511 of the chassis 501 with respect to the adaptor 516 surrounded by the light source holding section 503. Electronic components (not shown) such as a control microcomputer, a dimmer control circuit are mounted on the control substrate 507. The control substrate supporting section 573 is provided with an engaging concavity 573a engaging to the adaptor 516 at the inner surface and a cylindrical supporting tube 573b supporting the control substrate 507 at the outer surface. The control substrate 507 is supported by the base 511 of the chassis 501 in such a manner that the control substrate 507 is supported by the engaging nail 535 of the light source holding section 503 and the supporting tube 573b of the control substrate supporting section 573. Moreover, a receiving section 575 receiving a signal from a remote controller is attached to the control substrate 507.

As described above, the power supply section 506 and the control substrate 507 are attached to the power supply substrate holding section 563, the control substrate holding section 573 and the coupled light source holding section 503 such that an octagonal peripheral wall is formed, therefore, the LED module 502, the power supply section 506 and the control substrate 507 can be formed in an integrated manner so that it is possible that the integrated unit can be formed as a compact unit.

The power supply section 506 is electrically connected through wires 566, 567 to the LED module 502. A wire 569 as a jumper cable is used for electrical connection between the LED modules. The power supply section 506 is electrically connected through a wire 568 to the control substrate 507.

The power supply section 506 and the control substrate 507 are housed in a cavity to be formed by the base 511 of the chassis 501 and the light source holding section 503, and the cavity is sealed by a substrate cover 560. The substrate cover 560 is provided with a disc-shaped cover 560a having a circular hole at the center, a peripheral wall 560b vertically arranged at the inner edge portion of the cover 560a, and an annular section 560c being parallel and connected to the cover 560a from the opposite side of the cover 560a of the peripheral wall 560b. The annular section 560c is carried on the power supply substrate supporting section 563 and the control substrate supporting section 573, the outer edge portion of the cover 560a is fixed to the holding section 533 of the light source holding section 503 by a thread and the like.

As described above, the LED module 502, the power supply section 506, the control substrate 507 and the substrate cover 560 are attached to the chassis 501. The chassis 501 is provided with a ring cover 508 having light diffusion properties covering the LED module 502 and the reflection sheet 504. The ring cover 508 is provided with a disc-shaped annular section 581 having a circular hole at the center and a peripheral wall 582 vertically provided on the outer peripheral edge of the annular section 581. The ring cover 508 is attached to the peripheral wall 514 of the chassis 501 at the peripheral wall 582. The LED module 502 as the light source is housed in the cavity to be formed by the ring cover 508, the light source holding section 503 and the chassis 501 so that only the LED module 502 can be sealed.

A demountable center cover 509 as a disc-shaped power supply cover is attached to the inner peripheral edge portion of the annular section 581 of the ring cover 508. The center cover 509 is provided with a ring-shaped light penetrating section 591 and a non-light permeable cover 592 provided at the inner peripheral edge of the light penetrating section 591. Moreover, a circular hole for receiving the signal transmitted from a remote controller is provided at the cover 592, and a cover 590 is fitted to the circular hole.

The lighting apparatus main body, which is assembled as described above, is attached to the adaptor 516 such that the side of the one other surface 511b of the base 511 of the chassis 501 is at the side of the attaching member, after the connector of the adaptor 516 is connected to the connector connected to the power supply section 506, the center cover 509 is attached to the lighting apparatus main body. The attachment and removal from the attaching member such as the ceiling of the lighting apparatus main body can be performed by the removal of the center cover 509. The sealing of the section of the light source is to be kept because it is not necessary to remove the ring cover 508 and the like.

With regard to the lighting apparatus 500 related to Embodiment 5, the LED module 502 is not arranged at the outer edge portion of the chassis 501 (lighting apparatus), therefore, the distance to the LED module 502 from the center of the chassis 501 as the attachment site to be attached at the attaching member such as ceiling can be shortened. Compared with a case where the LED module 502 is arranged at the outer edge portion of the chassis 501, the moment acting on the chassis 501 can be reduced. Therefore, the deformation of the chassis 501 can be prevented and hence the reliability of the lighting apparatus 500 can be improved. The power supply section 506 is arranged at the central portion of the chassis 501, therefore, the power supply section 506 and the wires connecting the power supply section 506 and the LED module 502 can be concentrated at the side of the central portion of the chassis 501 so that the moment acting on the chassis 501 can be further reduced, the deformation of the chassis 501 is prevented and hence the reliability of the lighting apparatus 500 can be improved.

In the lighting apparatus 500 attached to the attaching member, the power supply section 506 is connected to an AC generator through the adaptor 516 and the attaching member such as the suspended ceiling body. In this status, when the power supply is on, an AC current is supplied to the power supply section 506, and then a power of a predetermined potential and current is supplied from the power supply section 506 to the LED module 502 and hence the LED module 502 having the daylight LED 522 and the incandescent LED 523 is lighted up.

Figure 25:
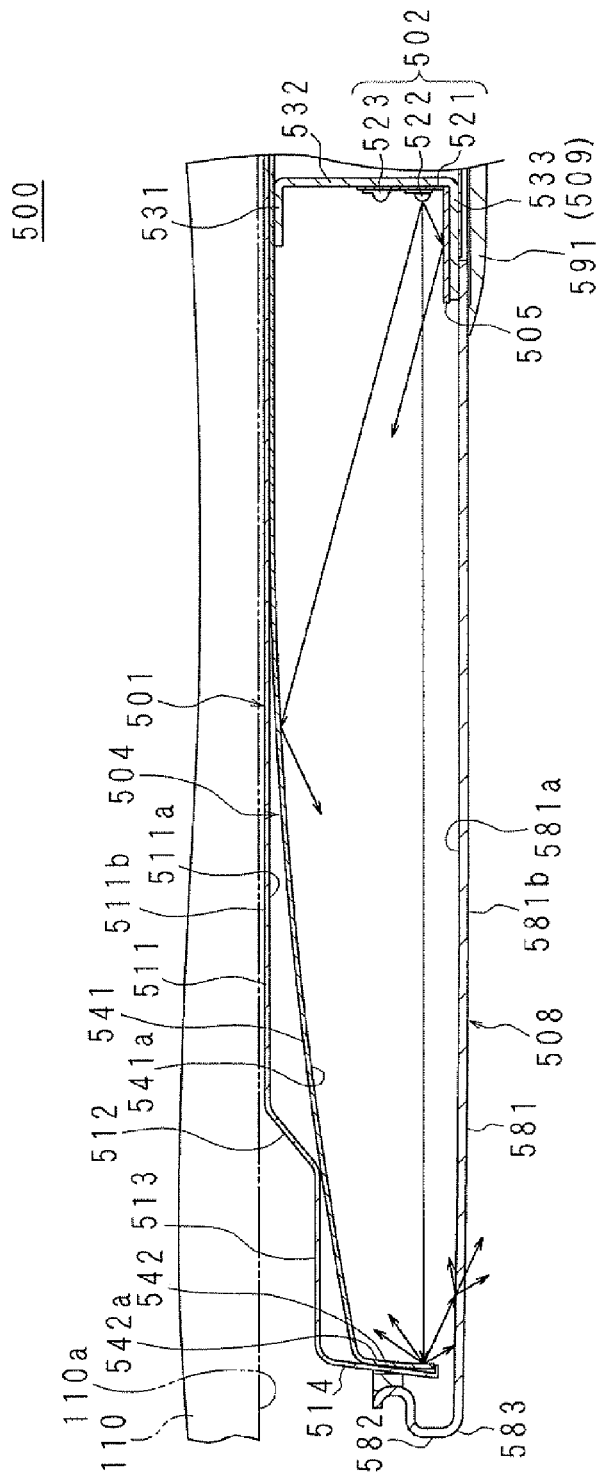
FIG. 25 is an explanation drawing of reflection of light emitted from the LED module in the lighting apparatus in accordance with Embodiment 5.
Figure 26:
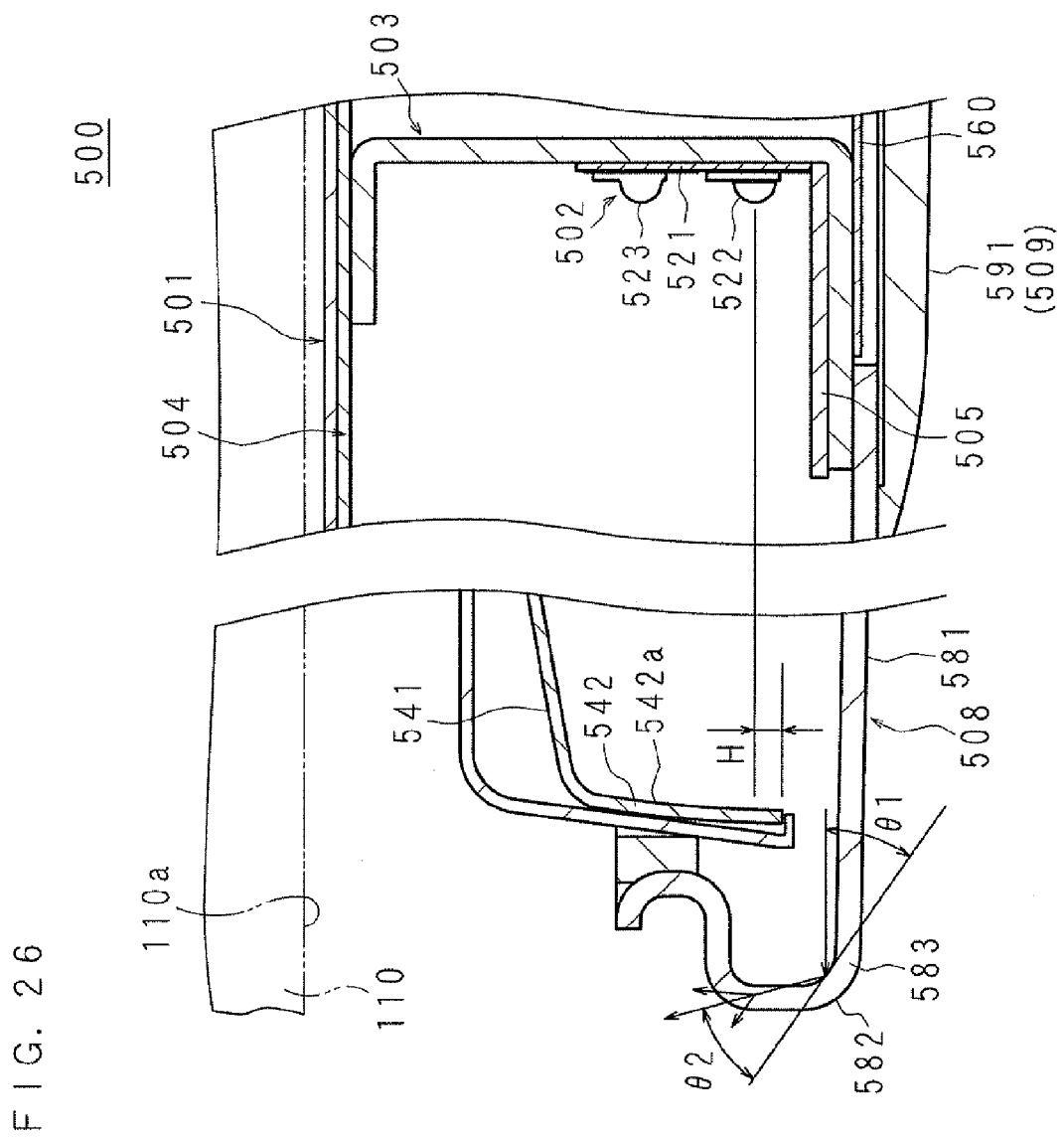
FIG. 26 is an explanation drawing of reflection of light emitted from the LED module in the lighting apparatus in accordance with Embodiment 5.
Figure 27:
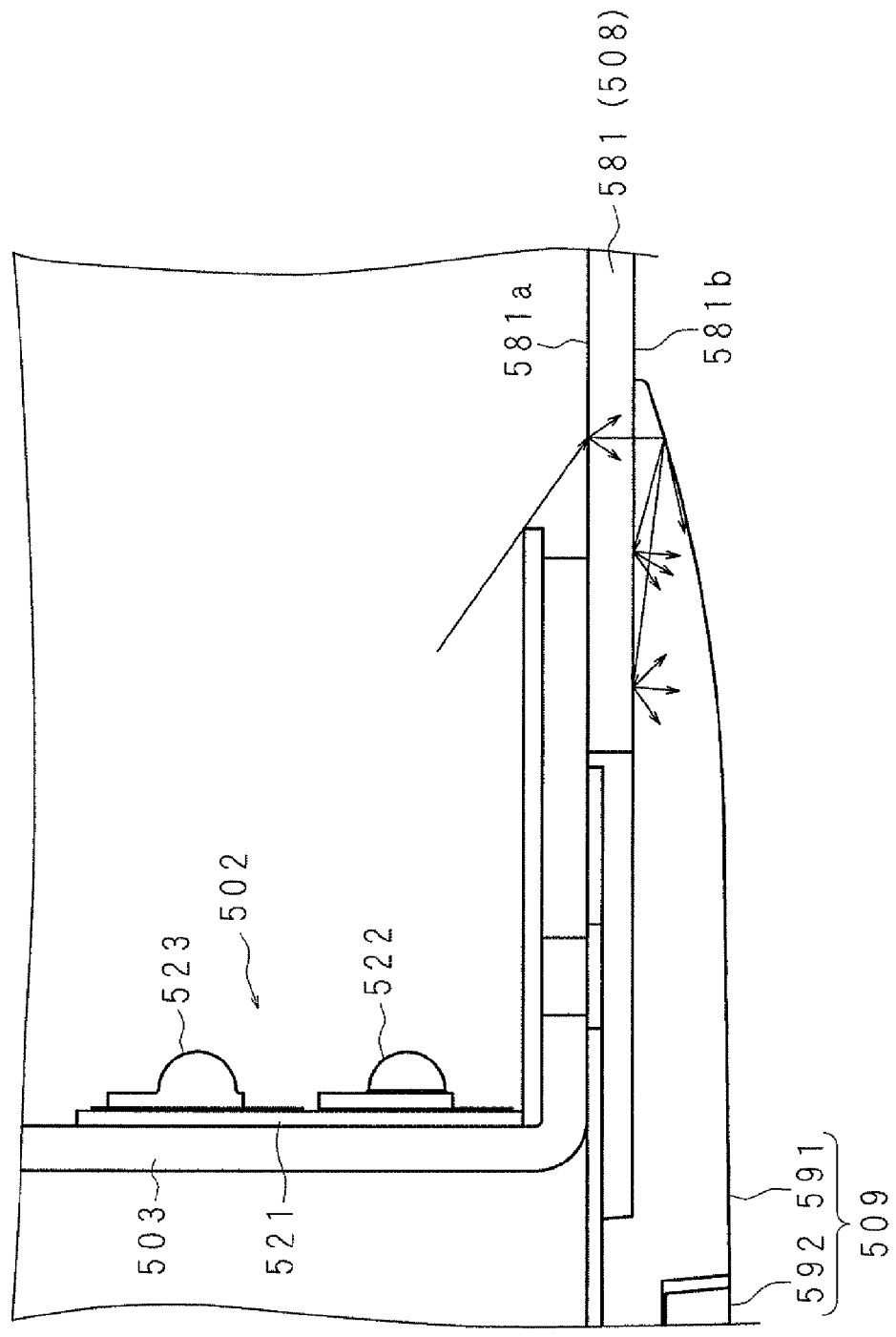
FIG. 27 is an explanation drawing of reflection of light emitted from the LED module in the lighting apparatus in accordance with Embodiment 5.

In the lighting apparatus 500, the light emitted from the LED module 502 is radiated in the direction toward the outer edge portion from the central portion of the lighting apparatus 500. In other words, the light is radiated in the direction toward the outer edge portion from the central portion of the chassis 501, and then the incoming light at the reflection sheet 504 or the top plate reflection sheet 505 is reflected on the reflection sheet 504 or the top plate reflection sheet 505, the light is mainly radiated in the direction crossing the direction of light emission from the LED module 502 (direction crossing a ceiling surface 110a of a ceiling 110). FIGS. 25 to 27 are explanation drawings of reflection of the light emitted from the LED module 502 in the lighting apparatus 500 related to Embodiment 5.

As indicated by the arrows in FIG. 25, a part of the light emitted from the LED module 502 is mirror-reflected on the one surface 541a of the disc section 541 of the reflection sheet 504. The other part of the light emitted from the LED module 502 is incident in a substantially right angle on the inner circumferential surface 542a of the peripheral wall 542 of the reflection sheet 504 which is opposite and separated from the direction of light emission from the LED module 502, and then the light is reflected irregularly on the inner circumferential surface 542a, in other words, the light is reflected in many directions. A part of the light diffused at the inner circumferential surface 542a of the peripheral wall 542 of the reflection sheet 504 is incident on the one surface 541a of the reflection sheet 504 and further reflected on the one surface 541a. The other part of the light is incident on the inner surface 581a of the ring cover 508 without being incident on the reflection sheet 504, and then the light is diffused inside the ring cover 508 and radiated to outside of the lighting apparatus 500 from the outer surface 581b of the ring cover 508.

As shown in FIG. 26, the peripheral wall 542 of the reflection sheet 504 is taller than the optical axis of the daylight LED 522 of the LED module 502 by a predetermined height (H). The predetermined height (H) is appropriately set, corresponding to the light distribution properties of the LED module 502, so that the light is sufficiently radiated from the lighting apparatus 500 toward the direction (indoor living space) crossing the ceiling surface 110a.

As described above, the radiating direction of the lighting apparatus 500 is a direction crossing the direction of light emission from the LED module 502, while the direction of light emission from the LED module 502 is the direction from the central portion of the lighting apparatus 500 to the outer edge portion thereof, in other words, the direction of light emission from the LED module 502 is the direction from the central portion of the chassis 501 to the outer edge portion thereof. Therefore, a part of the light emitted from the LED module 502 directly incident on the ring cover 508 and then exiting to outside of the lighting apparatus 500 can be reduced. Therefore, the direct light emitted from the LED module 502 entering to a user's eyes can be reduced and hence the glare can be reduced.

In a case where reflection members such as the reflection sheet 504, the top plate reflection sheet 505 and the like are not provided, it gradually becomes darker from the central portion toward the outer edge portion in the lighting apparatus. However, as the reflection sheet 504 is provided in the present embodiment, the light emitted from the LED module 502 can be reflected on the reflection sheet 504 in many directions. Therefore, the outer edge portion and central portion of the lighting apparatus 500 become brighter and hence a substantially uniform illumination with less illumination unevenness can be achieved.

Additionally, a part of the light emitted from the LED module 502, as indicated by the arrows in FIG. 25, is reflected on the top plate reflection sheet 505. Therefore, the direct light emitted from the LED module 502 exiting to outside of the lighting apparatus 500 from the vicinity of the LED module 502 can be prevented and hence the glare can be further reduced. Thus, the light intensity (low/high) corresponds to the distance (long/short) from the LED module 502. The direct light emitted from the LED module 502 exiting to outside of the lighting apparatus 500 from the vicinity of the LED module 502 is prevented so that the light with high intensity can be prevented from exiting to outside of the lighting apparatus 500. The illumination unevenness is further reduced, and a substantially uniform illumination can be achieved.

In the present embodiment, the daylight LED 522 as the light source with high color temperature is arranged at the farther side from the reflection sheet 504 than the incandescent LED 523 as the light source with low color temperature, therefore, the light emitted from the daylight LED 522, which is more eye-catching than the light emitted from the incandescent LED 523, is reflected on the reflection sheet 504 at the vicinity of the LED module 502 so that the amount of light exiting to outside of the lighting apparatus 500 can be reduced. The light emitted from the daylight LED 522 with strong light intensity to be radiated can be reduced. Therefore, the glare can further be reduced so that the illumination unevenness is further reduced and then a substantially uniform illumination can be achieved.

As shown in FIG. 26, the space (gap) through which the light passes is provided between the end part of the side of the outer edge portion of the reflection sheet 504 and the ring cover 508 in the present embodiment. The present embodiment provides an inclined portion 583 inclined toward the reflection sheet 504 in such a manner that the inclined portion 583 forms an angle as a predetermined angle θ1 with the optical axis of the daylight LED 522, at the outer edge portion of the light diffusible ring cover 508 with light diffusion characteristics covering the LED module 502 and the reflection sheet 504, in detail, at the coupling section between the annular section of the ring cover 508 and the peripheral wall 582 vertically arranged on the outer periphery of the annular section 581. Moreover, the predetermined angle θ1 is approximately set so that the light from the LED module 502 incident on the inclined portion 83 is mirror-reflected (θ2=θ1), for example, setting the angle to 30°. A part of the light emitted from the LED module 502 is mirror-reflected on the inclined portion 583 of the ring cover 508 and then the light is radiated toward the ceiling surface 110a of the ceiling 110. As a result, the boundary division between the outer edge portion of the lighting apparatus 500 and the ceiling 110 becomes not noticeable and hence the soft illumination can be achieved. Moreover, the inclined portion 583 may be bended as described in the present embodiment. Alternatively, the inclined portion 583 may also be an inclined plane.

In the present embodiment, the periphery of the center cover 509 as a power supply cover covering the power supply section 506 provided at the central portion of the chassis 501 is referred as an annular light transmitting section 591. The outer diameter of the light transmitting section 591 of the center cover 509 becomes larger than that of the top plate reflection sheet 505. A part of the light emitted from the LED module 502, as indicated in FIG. 27, is incident on the light transmitting section 591 as the periphery of the center cover 509 in a state where the incident angle is large, and then the light is diffused on the light transmitting section 591, in other words, the light is reflected in many directions. A part of the light, which is diffused on the light transmitting section 591, is further reflected on the ring cover 508 and exits to outside of the lighting apparatus 500. In this way, a part of the light emitted from the LED module 502 is radiated in many directions at the periphery of the center cover 509 and hence the boundary division between the center cover 509 and the ring cover 508 becomes not noticeable.

Figure 28:
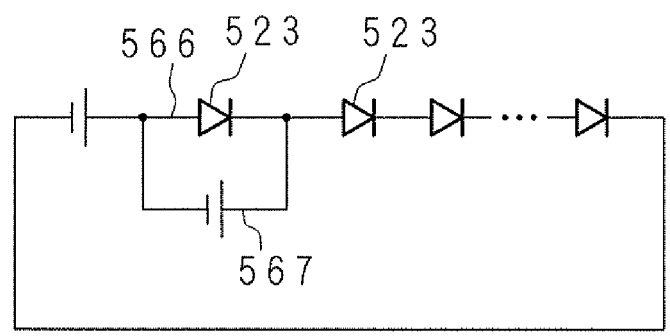
FIG. 28 is an explanation drawing of a night-light in the lighting apparatus in accordance with Embodiment 5.

In the present embodiment, at least one LED among the daylight LEDs 522 and the incandescent LEDs 523 of the LED module 502 can be independently lighted up and is possible to be configured as a night-light. FIG. 28 is an explanation drawing of a night-light in the lighting apparatus in Embodiment 5 as a schematic circuit diagram of a specified incandescent LED 523 of the LED module 502. An array of LEDs is connected in series by the plurality of incandescent LED 523. As shown in FIG. 28, the power is supplied to the array of LEDs by the power supply section 506 through the wire 566, however, it is possible to provide the power supplied by the power supply section 506 through the wire 567 individually to one of the plurality of incandescent LED 523. In this way, at least one of the incandescent LED 523 can be lighted up so that it is not necessary to provide a night-light for other purposes and hence the number of components can be reduced.

In the present embodiment, the incandescent LED 523 installed in the plurality of LED module 502 can be lighted up individually. The plurality of incandescent LEDs 523 are used as night-lights, however, one night-light may also be used. Additionally, the incandescent LED 523 is used as the night-light, however, the daylight LED 522 may also be used as the night-light or both of the daylight LED 522 and the incandescent LED 523 may also be used as the night-light.

In the present embodiment, an LED is used as the light source. Even if an LED with strong directivity is provided in the lighting apparatus, the above-mentioned reflection sheet 504 is provided in the lighting apparatus so that the light emitted from the LED module 502 is reflected in many directions and hence a substantially uniform illumination with less illumination unevenness can be achieved.

(Embodiment 6)

Figure 30:
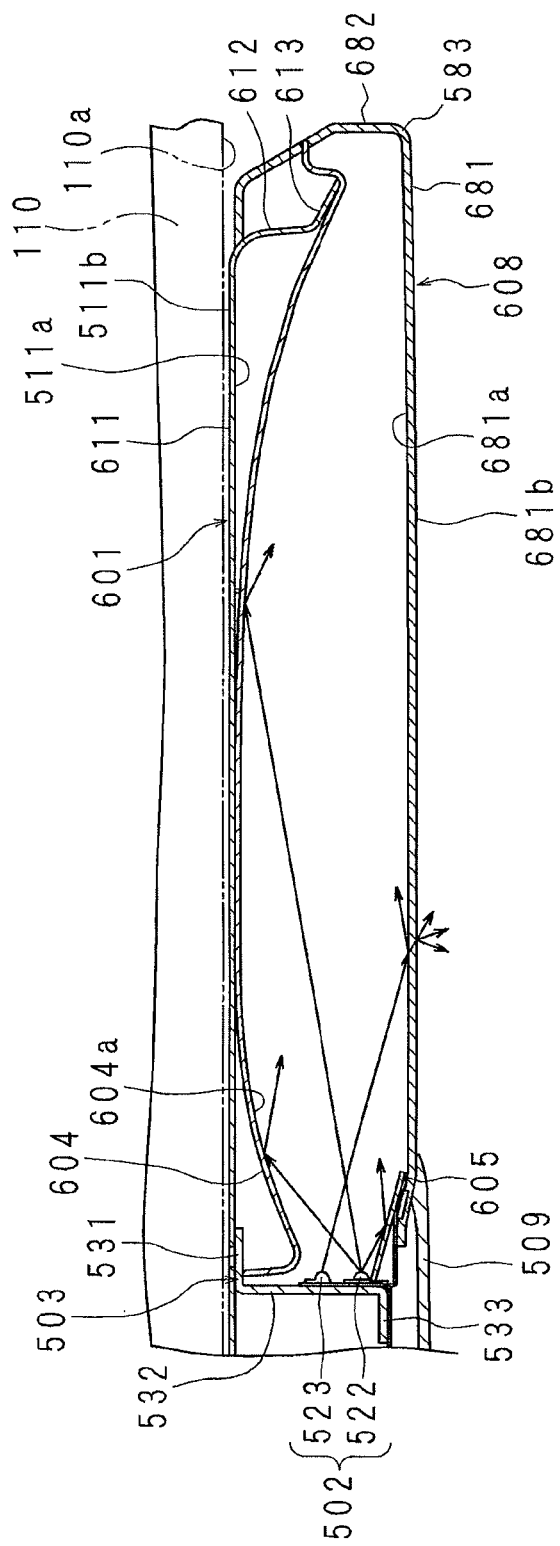
FIG. 30 is a schematic local enlarged cross-sectional view of the lighting apparatus in accordance with Embodiment 6.

FIG. 29 is a schematic cross-sectional view of a lighting apparatus 600 related to Embodiment 6 of the present invention. FIG. 30 is a local schematic enlarged cross-sectional view of the lighting apparatus 600 of Embodiment 6, in other words, an explanation drawing of the reflection of light emitted from the LED module 502 in the lighting apparatus 600 related to Embodiment 6. The shape of a reflection sheet 604 in Embodiment 6 is different from Embodiment 5. The shapes of a top plate reflection sheet 605, a chassis 601 and a ring cover 608 vary with respect to the shape of the reflection sheet 604.

The chassis 601 is provided with a disc-shaped base 611 having circular hole at the center, a connecting section 612 connected to the outer edge portion of the base 611 in the crossing direction, and an annular holding section 613 holding the reflection sheet 604 that is connected to the outer edge portion of the connecting section 612 in the crossing direction. The chassis 601 is made of metal such as iron or aluminum. Moreover, the chassis 601 also functions as a heat sink for radiating heat generated in a heat radiator such as a light source.

The disc-shaped reflection sheet 604 has an octagonal hole matching to the arrangement shape of the LED module 502 at the center, and the reflection sheet 604 is bended such that the side of one surface 604a becomes concave. More specifically, the one surface 604a as a reflection surface is inclined toward the side of the outer edge portion in a gradual manner from the central portion to the middle portion between the central portion and the outer edge portion, has a plane shape at the middle portion, and is inclined toward the side of the central portion in a gradual manner from the middle portion to the outer edge portion. The reflection sheet 604 is made of resin, and processing is applied to the surface for making diffused reflection easily. The convex side of the reflection sheet 604, that is, the surface at the opposite side of the one surface 604a is attached to the chassis 601 such that the surface is at the side of the chassis 601.

The top plate reflection sheet 605 is made of disc-shaped resin having an octagonal hole matching to the arrangement shape of the LED module 502 at the center, processing is applied to the surface for making diffused reflection easily. With regard to the top plate reflection sheet 605, the reflection surface is inclined to the outward direction such that the side of the reflection surface becomes concave.

The ring cover 608 is provided with a disc-shaped annular section 681 having a circular hole at the center and a peripheral wall 682 vertically arranged on the outer periphery of the annular section 681. The ring cover 608 is attached to the chassis 601 at the peripheral wall 682. Other elements identical to those described above with reference to Embodiment 5 illustrated in FIGS. 21 and 25 are designated with the same reference numerals and a detailed description thereof is omitted herein.

Even in the lighting apparatus 600 related to Embodiment 6 configured as described above, the LED module 502 is not arranged at the outer edge portion of the chassis 601 (the lighting apparatus), therefore, as similar to the lighting apparatus 500 related to Embodiment 5, the moment acting on the chassis 601 can be reduced. Therefore, the deformation of the chassis 601 is prevented and hence the reliability of the lighting apparatus 600 can be improved.

In the lighting apparatus 600 related to Embodiment 6, a part of the light emitted from the LED module 502, as shown by the arrows in FIG. 30, is mirror-reflected on the one surface 604a of the reflection sheet 604. Other part of the light emitted from the LED module 502 is incident on an inner surface 681a of the ring cover 608 without being incident on the reflection sheet 604, and then the light is diffused inside the ring cover 608 and exits to outside of the lighting apparatus 600 from an outer surface 681b of the ring cover 608. Moreover, a part of the light emitted from the LED module 502, as indicated by the arrows in FIG. 30, is reflected on the top plate reflection sheet 605.

Even in the lighting apparatus 600 related to Embodiment 6, the radiating direction of the lighting apparatus 600 is a direction crossing the direction of light emission from the LED module 502, while the direction of light emission from the LED module 502 is the direction from the central portion of the lighting apparatus 600 to the outer edge portion thereof, in other words, the direction of light emission from the LED module 502 is the direction from the central portion of the chassis 601 to the outer edge portion. Therefore, the glare can be reduced as similar in the lighting apparatus 500 related to Embodiment 5.

Even in the lighting apparatus 600 related to Embodiment 6, the light emitted from the LED module 502 can be reflected on the reflection sheet 604 in many directions so that the outer edge portion and central portion of the lighting apparatus 600 can be brighter and hence a substantially uniform illumination with less illumination unevenness can be achieved as similar in Embodiment 5.

Thus, as similar to the lighting apparatus 500 in Embodiment 5, the direct light emitted from the LED module 502 exiting to outside of the lighting apparatus 600 from the vicinity of the LED module 502 can be prevented by providing the top plate reflection sheet 605 so that the glare and illumination unevenness can be further reduced and hence a substantially uniform illumination can be achieved.

(Embodiment 7)

Figure 31:
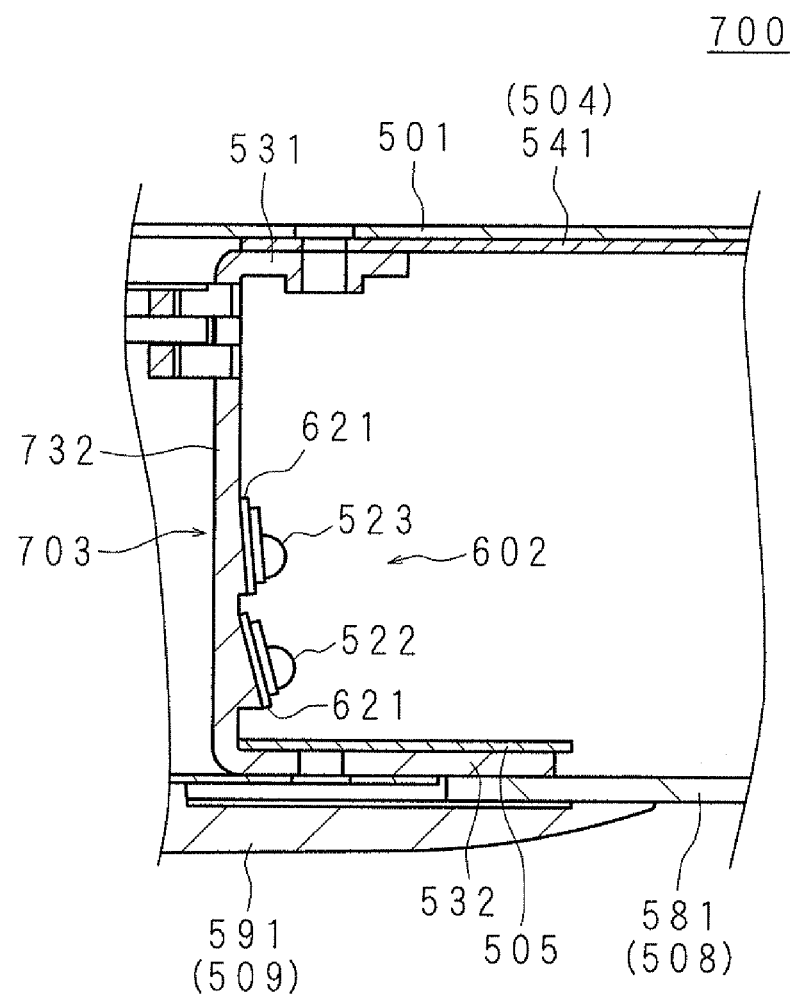
FIG. 31 is a schematic local enlarged cross-sectional view of a lighting apparatus in accordance with Embodiment 7.

FIG. 31 is a schematic local enlarged cross-sectional view of a lighting apparatus 700 related to Embodiment 7. In the present embodiment, LED substrates 621 are provided to a daylight LED 522 and an incandescent LED 523 separately, these LED substrates 621 are inclined and attached to a holding plate 732 of a light source holding section 703. The daylight LED 522 is more inclined toward the reflection sheet 504 than the incandescent LED 523. Other elements identical to those described above with reference to Embodiment 5 shown in FIG. 21 are designated with the same reference numerals and a detailed description thereof is omitted herein.

In the lighting apparatus 700 related to Embodiment 7, the LED substrates 621 on which the daylight LED 522 and the incandescent LED 523 of the LED module 602 are mounted are inclined toward the reflection sheet 504 so that the middle portion between the central portion and the outer edge portion of the lighting apparatus 700 as well as the outer edge portion can be brighter and so that a substantially uniform illumination can be achieved as similar in Embodiment 5. Moreover, in the present embodiment, the daylight LED 522 is more inclined toward the reflection sheet 504 than the incandescent LED 523, however, it is not limited to this case. The inclined angles of the daylight LED 522 and the incandescent LED 523 may be the same or opposite.

Thus, even in the lighting apparatus 700 related to Embodiment 7, the LED module 602 is not arranged on the outer edge portion of the chassis 501 (the lighting apparatus), therefore, the moment acting on the chassis 501 can be reduced so that the deformation of the chassis 501 is prevented and hence the reliability of the lighting apparatus 700 can be improved.

(Embodiment 8)

Figure 32:
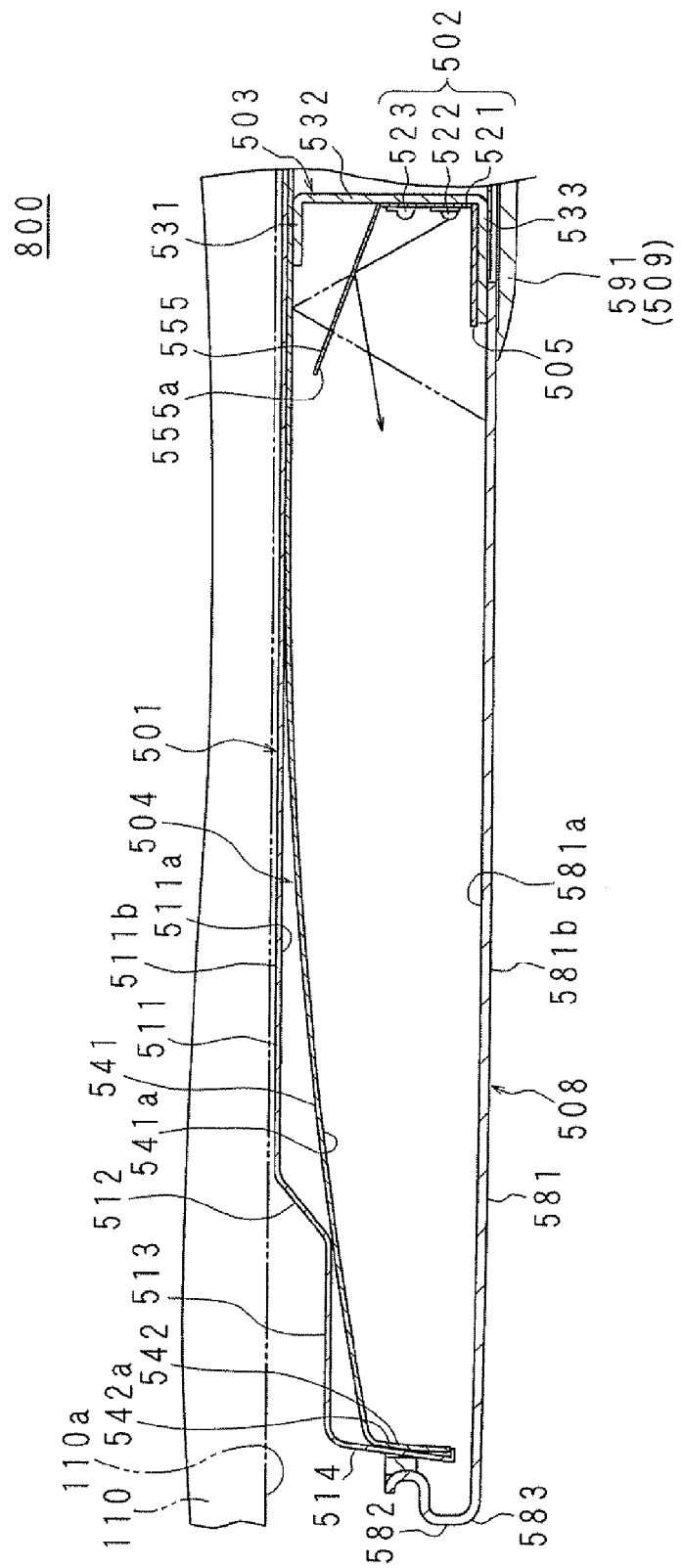
FIG. 32 is a schematic local enlarged cross-sectional view of a lighting apparatus in accordance with Embodiment 8.

FIG. 32 is a schematic local enlarged cross-sectional view of the lighting apparatus 800 related to Embodiment 8. The lighting apparatus 800 related to the present embodiment is configured by adding a mirror reflection member 555 for mirror-reflecting the light emitted from the LED module 502 in the lighting apparatus 500 in Embodiment 5.

The mirror reflection member 555 is attached to a light source holding section 503. The mirror reflection member 555 forms a plated member in a conical shape having an octagonal shape at the center, and one surface 555a is inclined outwardly such that the side of the one surface 555a as the reflection surface becomes convex. The mirror reflection member 555 is fixed to a holding plate 532 of the light source holding section 503 along the long side to which an incandescent LED 523 of the LED module 502 is mounted (the long side and opposite side to which a top plate reflection sheet 505 is attached) such that the side of the one surface 555a is at the side of the LED module 502. The mirror reflection member 555 is not limited to the mirror, a member capable of performing mirror reflection may also be used. Other elements identical to those described above with reference to Embodiment 5 illustrated in FIG. 25 are designated with the same reference numerals and a detailed description thereof is omitted herein.

In the lighting apparatus 800 related to Embodiment 8, a part of the light emitted from the LED module 502 exits toward the chassis 501 at the vicinity of the LED module 502, as indicated by the arrows in FIG. 32, the light is mirror-reflected on the one surface 555a of the mirror reflection member 555, and then the light exits to the outer edge portion of the lighting apparatus 800. In a case where the mirror reflection member 555 is not provided, a part of the light exiting to the chassis 501 at the vicinity of the LED module 502, as indicated by the two-dotted line in FIG. 32, is reflected on the chassis 501, and then the light is incident on a ring cover 508 at the vicinity of the LED module 502 and diffused inside the ring cover 508 while the light is exiting to outside of the lighting apparatus 800. The light intensity (low/high) corresponds to the distance from the LED module 502 (long/short) as described above. Therefore, in a case where the mirror reflection member 555 is not provided, the light with high intensity is included in the light radiated from the vicinity of the LED module 502 to outside of the lighting apparatus 800. As the mirror reflection member 555 is provided, however, the light with high intensity can be reflected toward the outer edge portion of the lighting apparatus 800.

In Embodiment 8, the light with high intensity exiting to outside of the lighting apparatus 800 from the vicinity of the LED module 502 can further be prevented along with the effects achieved in the configuration of the lighting apparatus 500 related to Embodiment 5.

Figure 33:
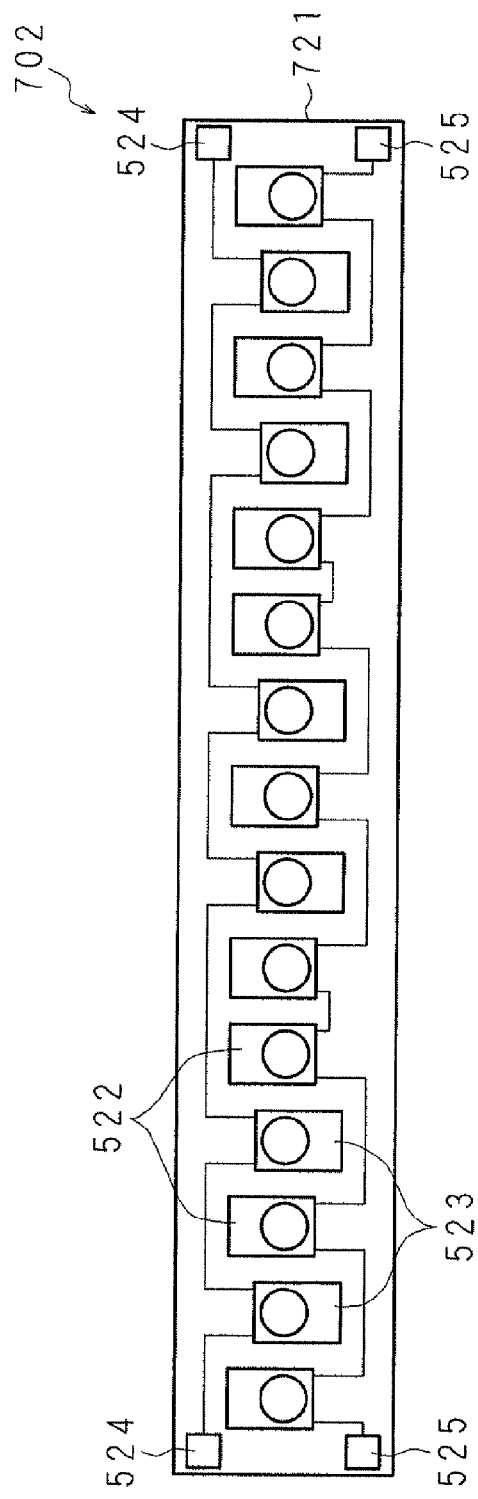
FIG. 33 is a schematic view illustrating an example of another applicable LED module in the present invention.

In the above embodiments, the LED module 502 in which light sources with different color temperatures (the daylight LED 522 and the incandescent LED 523) are arranged in parallel is used, however, an applicable LED module is not limited to this case. For example, light sources with different color temperatures may be arranged on a substantially straight line. FIG. 33 is a schematic view illustrating an example of another applicable LED module 702 in the present invention.

As shown in FIG. 33, the LED module 702 is provided with a rectangular plated LED substrate 721, a plurality of daylight LEDs 522 mounted on the LED substrate 721 along the long side in series that emit the light with daylight color, and a plurality of incandescent LEDs 523 mounted between daylight LEDs 522 that emit the light with incandescent color. The LED module 702 is different from the LED module 502, and the light emitting sections (the parts of an LED element and sealing resin noted as circles in the figure) of the daylight LED 522 and the incandescent LED 523 are at the inner side. The daylight LED 522 and the incandescent LED 523 are arranged alternately such that the light emitting sections of the daylight LEDs 522 and the incandescent LEDs 523 are arranged on a substantially straight line.

A first connecting section 525 is arranged on both ends of a circuit pattern for power supply in which the plurality of daylight LEDs 522 are connected in series. Similarly, a second connecting section 524 is arranged on both ends of a circuit pattern for power supply in which the plurality of incandescent LEDs 523 are connected in series. Moreover, with regard to the connection between the plurality of LED modules 702, these first connecting section 525 and second connecting section 524 are connected to each other by wires 569 as jumper cables.

The light emitting sections of the daylight LEDs 522 and the incandescent LEDs 523 are arranged on a substantially straight line in the LED module 702. As compared with a case where the daylight LEDs 522 and the incandescent LEDs 523 are arranged in parallel, it is easy to optimally design reflection members such as a reflection sheet, top plate reflection sheet, mirror reflection member and the like. Therefore, a substantially uniform illumination with less illumination unevenness can be achieved.

Moreover, the daylight LED 522 and the incandescent LED 523 are mounted on the LED substrate 721 such that the sides of the light emitting sections are at the inner side of the substrate. Therefore, as shown in FIG. 33, the wire bypassing other LEDs and forming a circuit pattern without elongating the wire length can be achieved and hence the interconnection becomes easier.

(Embodiment 9)

Figure 34:
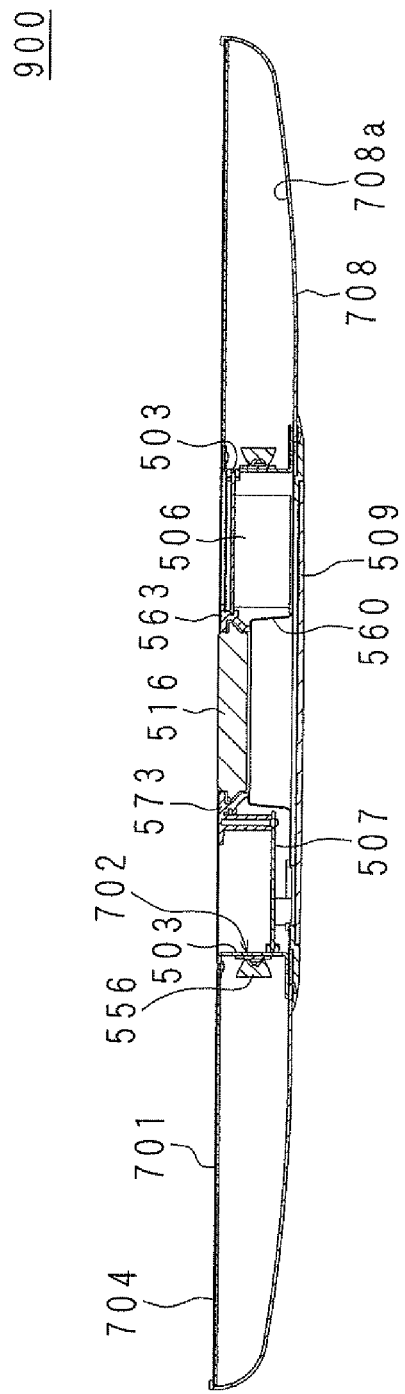
FIG. 34 is a schematic cross-sectional view of a lighting apparatus in accordance with Embodiment 9.
Figure 35:
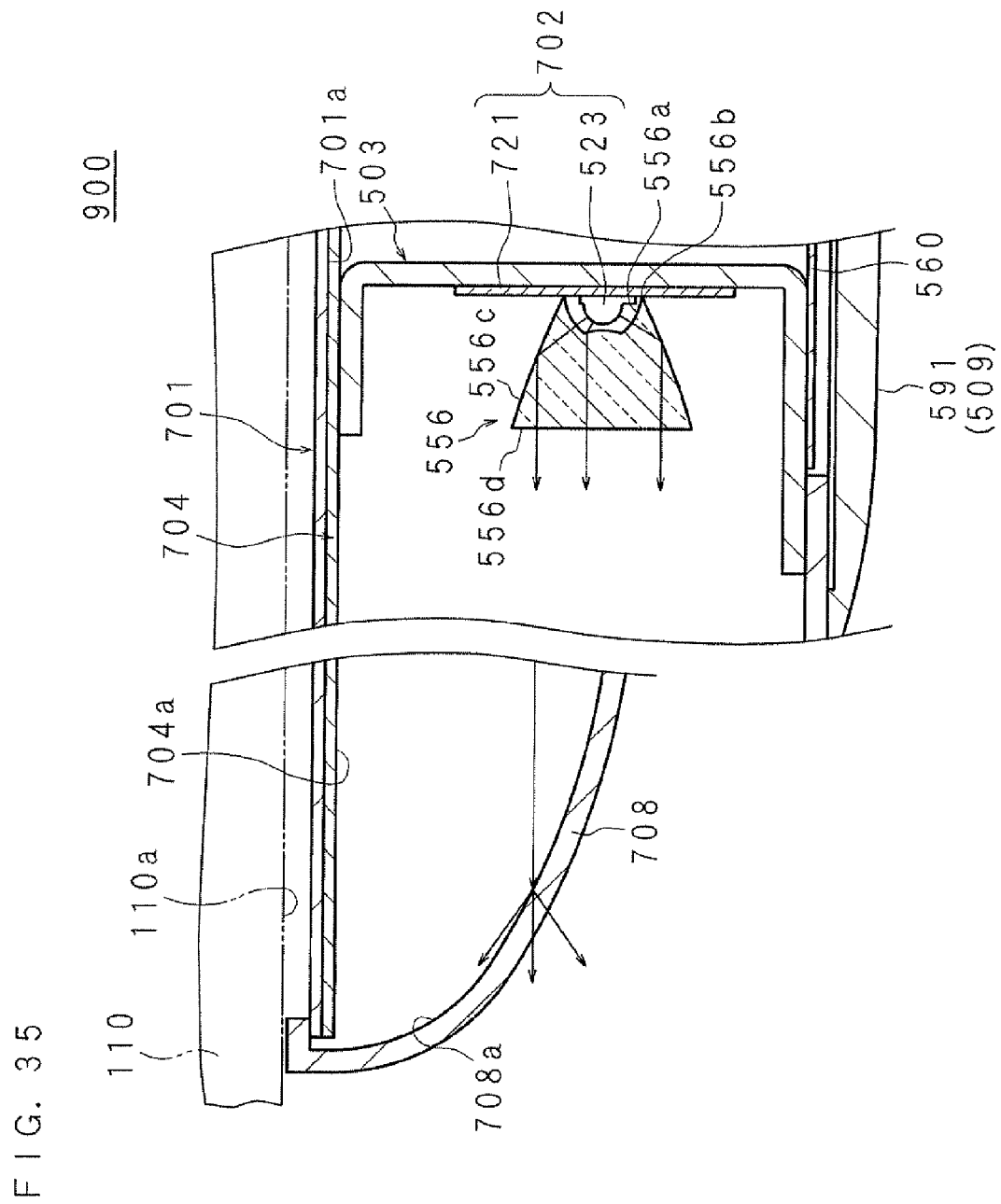
FIG. 35 is a schematic local enlarged cross-sectional view of the lighting apparatus in accordance with Embodiment 9.

FIG. 34 is a schematic cross-sectional view of a lighting apparatus 900 related to Embodiment 9. FIG. 35 is a schematic local enlarged view of the lighting apparatus 900 related to Embodiment 9. The present embodiment is different from the above embodiments. In addition to a reflection member such as a reflection sheet, a lens is used in the present embodiment.

A chassis 701 holding a light source and a reflecting section forms a disc shape having a circular hole at the center. The chassis 701 is made of metal such as iron or aluminum. The chassis 701 also functions as a heat sink for radiating heat generated in a heat radiator such as a light source.

An LED module 702 is attached to one surface 701a of the chassis 701 through a light source holding section 503 to surround the periphery of an adaptor 516 in a radial direction. The LED module 702 is the same as the LED module 702 illustrated in FIG. 33 in Embodiment 8, therefore, the detailed description is omitted.

A reflection sheet 704 as the reflecting section for reflecting the light emitted from the LED module 702 is provided at the chassis 701. The reflection sheet 704 is made of resin forming a disc shape that has an octagonal hole matching to the arrangement shape of the LED module 702 at the center, and processing is applied to one surface 704a for making diffused reflection easily. The reflection sheet 704 is attached to one surface 701a of the chassis 701 such that the surface at the opposite side of the one surface 704a is at the side of the chassis 701.

Figure 36:
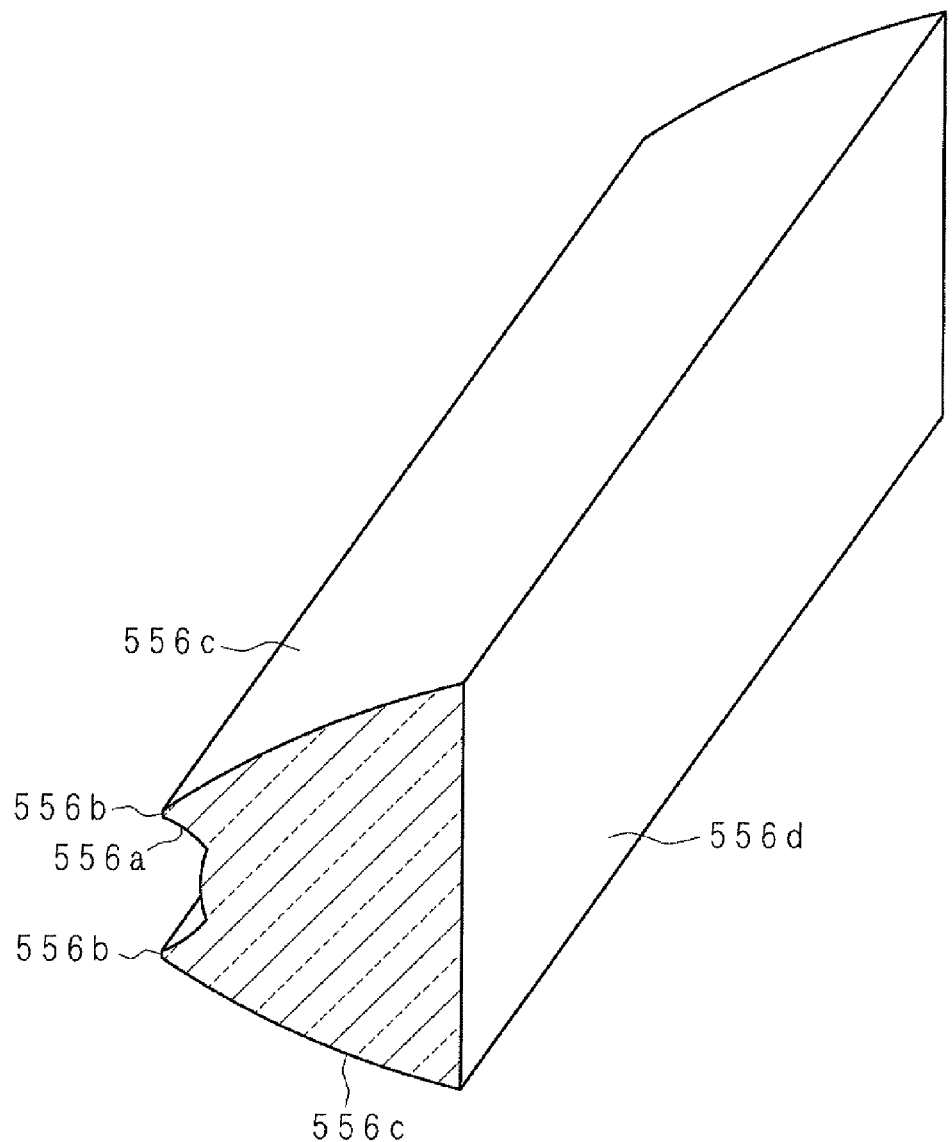
FIG. 36 is a schematic perspective view of a lens to be used in the lighting apparatus in accordance with Embodiment 9.

A lens 556 as an optical member for varying the direction of light emission from the LED module 702 is attached to the LED module 702. FIG. 36 is a schematic perspective view of the lens 556 used in the lighting apparatus 900 in Embodiment 9.

The lens 556 is provided with a light incident surface 556a which has a curved portion symmetrical with respect to a surface perpendicular to the LED substrate 721 including the lines (optical axes) passing through the optical centers of a daylight LED 522 and an incandescent LED 523 of the LED module 702 and on which the light emitted from the daylight LED 522 and the incandescent LED 523 of the LED module 702 is incident; a light reflection surface 556c which has a curved portion symmetrical with respect to the surface perpendicular to the LED substrate 721 and reflects the light incident on the light incident surface 556a; a light exiting surface 556d which has a rectangular plane surface and emits the light incident on the light incident surface 556a and the light reflected by the light reflection surface 556c; and a base surface 556b which is parallel to the light exiting surface 556d and has a function as a holding surface for lens including the edge of the light incident surface 556a and the light reflection surface 556c. Additionally, the light reflection surface 556c is formed appropriately such that the light emitted from the daylight LED 522 and the incandescent LED 523 and being incident on the light incident surface 556a can be reflected in parallel direction with respect to the optical axes of the daylight LED 522 and the incandescent LED 523.

The lens 556 is attached to the LED substrate 721 of the LED module 702 at the side of the base surface 556b for covering the direction of light emission from the daylight LED 522 and the incandescent LED 523 mounted on the LED substrate 721 of the LED module 702. Under this attachment condition, the light emitting surface of the daylight LED 522 and the incandescent LED 523 is aligned to the plane including the peripheral edge of the light incident surface 556a or the side of the lens 556 at the plane.

A light diffusible ring cover 708 covering the LED module 702 and the reflection sheet 704 is attached to the chassis 701. The ring cover 708 has a circular hole at the center. The ring cover 708 is bended such that the side of one surface 708a becomes concave from the central portion toward the outer edge portion, and the angle formed between the one surface 708a and the direction of optical axis of the LED continuously becomes larger from the central portion toward the outer edge portion. Other elements identical to those described above with reference to Embodiment 5 illustrated in FIGS. 21 and 26 are designated with the same reference numerals and a detailed description thereof is omitted herein.

Even in the lighting apparatus 900 related to Embodiment 9, the LED module 702 is not arranged at the outer edge portion of the chassis 701 (the lighting apparatus), therefore, the distance between the LED module 702 and the center of the chassis 701 as the attaching location to be attached to an attaching member such as ceiling can be shortened. As compared with a case where the LED module 702 is arranged on the outer edge portion of the chassis 701, the moment acting on the chassis 701 can be reduced so that the deformation of the chassis 701 can be prevented and hence the reliability of the lighting apparatus 900 can be improved. A power supply section 506 is arranged at the central portion of the chassis 701, therefore, the power supply section 506 and the wire connecting the power supply section 506 and the LED module 702 are concentrated at the side of the central portion of the chassis 701 so that the moment acting on the chassis 701 can further be reduced. Therefore, the deformation of the chassis 701 is prevented so that reliability of the lighting apparatus 900 can be improved.

In the lighting apparatus 900 related to Embodiment 9 configured as described above, the light emitted from the LED module 702, as shown by the arrows in FIG. 35, is incident on the light incident surface 556a of the lens 556. A part of the incident light passes through the light exiting surface 556d directly in the direction perpendicular to the light exiting surface 556d, and other part of the incident light is reflected on the light reflection surface 556c and exits from the light exiting surface 556d in the direction perpendicular to the light exiting surface 556d. In other words, by providing the lens 556, the light emitted from the LED module 702 is exited in the direction from the central portion of the lighting apparatus 900 to the outer edge, that is, in the direction from the central portion of the chassis 701 to the outer edge.

Thus, the light exited from the lens 556 is incident on the ring cover 708. A part of the incident light is reflected on the one surface 708*a* of the ring cover 708 at the side of the chassis 701. Other part of the incident light is diffused inside the ring cover 708 and exits to outside of the lighting apparatus 900 from the ring cover 708. Additionally, the ring cover 708 is formed such that the angle between the one surface 708*a* and the direction of the optical axis of an LED continuously becomes larger from the central portion toward the outer edge portion. Therefore, the total reflection occurs easily because of the smaller incident angle in a case where the light incident on the ring cover 708 is at the side of the central portion of the ring cover 708, and the diffused reflection occurs easily because of the larger incident angle in a case where the light incident on the ring cover 708 is at the outer edge portion of the ring cover 708. The light reflected at the side of the chassis 701 is reflected on the reflection sheet 704 at the side of the ring cover 708. In this way, the light radiated from the lens 556 can be reflected in many directions since the light radiated from the lens 556 is reflected on the ring cover 708 and the reflection sheet 704. Therefore, the region from the outer edge portion to the central portion of the lighting apparatus can be brighter so that a substantially uniform illumination with less illumination unevenness can be achieved as similar in above-mentioned embodiments.

The direction of light emission from the lens 556 refers to the direction from the central portion of the lighting apparatus 900 to the outer edge portion, that is, the direction from the central portion of the chassis 701 to the outer edge portion. Accordingly, the total reflection occurs easily at the side of the central portion of the ring cover 708 as mentioned above, therefore, there is little direct light passing through the ring cover 708 at the side of the central portion of the ring cover 708, in other words, at the vicinity of the LED module 702. That is, the light directly incident on the ring cover 708 at the vicinity of the LED module 702 and exiting to outside of the lighting apparatus 900 can be reduced so that the direct light emitted from the LED module 702 entering to the eyes of a user can be reduced and hence the glare can be reduced.

The shape of the lens 556 may be the shape which can concentrate light by means of bending the light emitted from the daylight LED 522 and the incandescent LED 523 into the direction nearly parallel to the optical axes of the daylight LED 522 and the incandescent LED 523. The present embodiment is configured to provide one lens 556 for one LED module 702, however, it is not only limited to this case. Each one lens may be provided to each LED. In this case, truncated conical lenses are parallel arranged corresponding to the number of LEDs. Additionally, a lens linked to a part of the plurality of truncated conical lens may be formed.

FIG. 37 is a schematic cross-sectional view showing an example of other applicable lens in Embodiment 9. FIG. 37 is an example of a lens linked to a part of a plurality of truncated conical lens. FIG. 37 is an intercept schematic cross sectional view of a lens 557 at the plane perpendicular to the LED substrate 721 including the optical axes of the daylight LED 522 and the incandescent LED 523 of the LED module 702.

The lens 557 is provided with a light incident surface 557*a* which has a curved portion symmetrical with respect to an optical axis of each LED and on which the light emitted from the daylight LED 522 and the incandescent LED 523 of the LED module 702 is incident; a light reflection surface 557*c* which has a curved portion symmetrical with respect to the optical axis of each LED reflects the light incident on the light incident surface 557*a*; a light exiting surface 557*d* which has a rectangular plane surface and emits the light incident on the light incident surface 557*a* and the light reflected by the light reflection surface 557*c*; and a base surface 557*b* which is parallel to the light exiting surface 557*d* and has a function as a holding surface for lens including the edge of the light incident surface 557*a* and the light reflection surface 557*c*. Additionally, the light reflection surface 557*c* is formed appropriately such that the light emitted from the daylight LED 522 and the incandescent LED 523 and being incident on the light incident surface 557*a* can be reflected in parallel direction with respect to the optical axes of the daylight LED 522 and the incandescent LED 523.

The lens 557, as similar to the lens 556, is used to be attached to the LED substrate 721 of the LED module 702 at the side of the base surface 557*b* to cover the direction of light emission from the daylight LED 522 and the incandescent LED 523 mounted on the LED substrate 521 of the LED module 702. In the case where the lens 557 is used, the similar effect is achieved as in the case where the lens 556 is used.

Figure 38A:
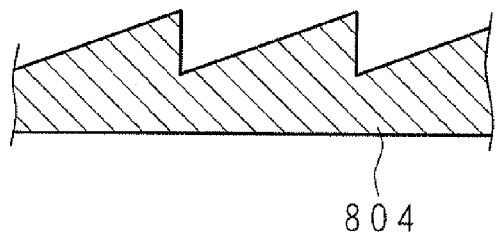
FIG. 38A is an explanation drawing of protrusions provided at a reflection sheet.
Figure 38B:
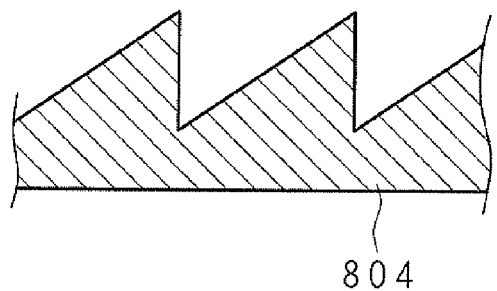
FIG. 38B is an explanation drawing of protrusions provided at a reflection sheet.
Figure 38C:
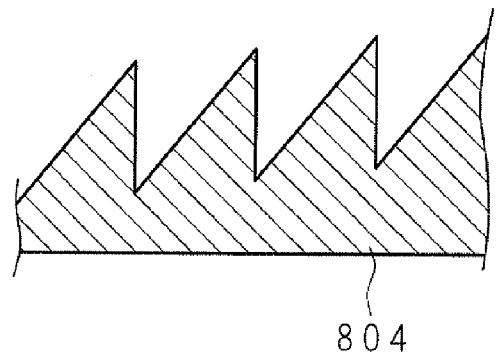
FIG. 38C is an explanation drawing of protrusions provided at a reflection sheet.
Figure 39:
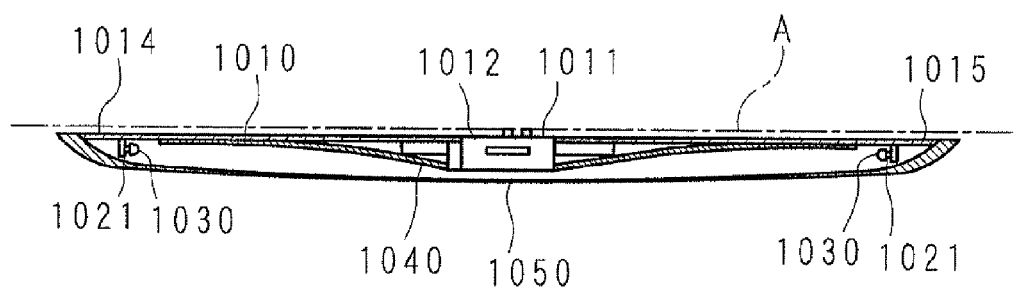
FIG. 39 is a schematic cross-sectional view of a conventional lighting apparatus.

In the above-mentioned embodiments, a plane sheet as the reflection sheet is used. However, it is not limited to this case. A protrusion having an inclined surface inclined toward the LED module may also be provided. FIGS. 38A to 38C are explanation drawings of protrusions provided at the reflection sheet 804. The projection height of a protrusion is getting higher and the space between neighboring protrusions is getting narrower according to the direction from the central portion to the outer edge portion of the lighting apparatus, that is, the direction from the central portion to the outer edge portion of the chassis. In detail, at one surface of the reflection sheet 804 at the side of the central portion of the chassis, a moderate inclined surface is provided and the space between protrusions is wider (see FIG. 38A), at the middle portion between the central portion and the outer edge portion, a larger inclined surface is provided than the surface provided at the central portion and the space between protrusions is narrower (see FIG. 38B), at the outer edge portion, a further larger inclined surface is provided and the space between protrusions is further narrower (see FIG. 38C).

In this way, by varying the inclined angle and the space of the protrusion formed on the reflection sheet 804, the incident angle formed between the light incident upon the reflection sheet 304 and the reflection sheet 804 is larger so that the diffused reflection occurs easily as moving toward the outer edge portion of the reflection sheet 804. Accordingly, the light emitted from the LED module can be reflected on the reflection sheet 804 in many directions so that the outer edge portion and the central portion of the lighting apparatus can be brighter. Therefore, a substantially uniform illumination with less illumination unevenness can be achieved as similar to the above-mentioned embodiments.

Moreover, in above embodiments, the LED substrate may be arranged as an octagonal shape on the chassis, however, it is not limited to this case. The LED substrate may also be arranged in a polygon shape other than octagonal or circular shape. In addition, the annular shape is not limited to a circular shape, but includes a polygon shape as the present embodiment and includes also a triangle shape and an octagonal shape. The respective light sources forming an annular shape may not be arranged with same interval Moreover, in all embodiments, the reflection sheet and the top reflection sheet are used as the reflecting member, however, the reflection sheet only may also be used as the reflecting member. With regard to the configuration described in Embodiments 5 to 9 and the configuration of providing a protrusion at one surface of the reflection sheet, some embodiments may also be combined together appropriately to further achieve a substantially uniform illumination with less illumination unevenness.

The light source holding section is provided at the chassis separately in above embodiments. However, the light source holding section may be integrated into the chassis.

In above embodiments, the LED module is provided at the central portion of the chassis, however, it is not necessary to arrange the LED module at the exact center of the chassis. For example, the LED module may be arranged to surround the periphery of an adaptor in the radial direction so as to be configured to emit the light to the outer edge portion, the deformation such as bending of the chassis may be prevented.

With regard to the light sources with different color temperatures, two kinds of light sources with daylight color and incandescent color are used. However, it is not limited to this case. One kind of light source may be used, or more than three kinds of light sources may also be used as the light sources with different color temperatures. In above embodiments, an LED is used as the light source, however, it is not limited to this case. EL (Electro Luminescence) may also be used as the light source.

In above embodiments, a so-called pendent light, a suspension-type lighting apparatus suspended by a suspension tool from ceiling or the like, and a so-called ceiling light, an attachment-type lighting apparatus attached to an attaching member such as ceiling are described as examples. The lighting apparatus of the present invention is not limited to these apparatuses, but it is applicable to other types of lighting apparatus such as a bulb-type lighting apparatus.

Furthermore, with regard to this invention, it is needless to say that the scope of matter described in claims can be practiced by other modified modes.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A lighting apparatus comprising:
    a plurality of light sources held by an apparatus main body for emitting light toward an outer edge portion of the apparatus main body; and
        an optical control member for controlling the direction of light emission from the plurality of light sources to perform illumination,
        wherein the optical control member is a light guiding member with a hole,
        wherein the light sources are provided such that light is incident on the optical control member from a peripheral surface of the hole,
        wherein an inclined surface, which is inclined to the direction crossing the direction of light emission from the light sources, is provided at an outer edge portion of the optical control member, and
        wherein the optical control member allows the light propagated through the optical control member to emit to outside from the inclined surface.

2. The lighting apparatus according to claim 1,
    wherein the optical control member is formed into a plate shape, a plurality of reflection sections are provided for diffusing the light emitted from the light source at one surface of the optical control member, and
    wherein the plurality of reflection sections are provided such that the size of the area (large/small) of diffusing the light emitted from the light source corresponds to the distance (far/near) from the light source.

3. The lighting apparatus according to claim 2,
    wherein the optical control member is formed such that the change in thickness (decrease/increase) corresponds to the distance (far/near) from the light source.

4. The lighting apparatus according to claim 1,
    wherein the optical control member is formed such that the change in thickness (decrease/increase) corresponds to the distance (far/near) from the light source.

5. The lighting apparatus according to claim 1,
    wherein the optical control member is formed into a plate shape, a plurality of reflection sections are provided for diffusing the light emitted from the light source at one surface of the optical control member, and
    wherein the plurality of reflection sections are provided such that the size of the area (large/small) of diffusing the light emitted from the light source corresponds to the distance (far/near) from the light source.

6. The lighting apparatus according to claim 1,
    wherein the optical control member is formed such that the change in thickness (decrease/increase) corresponds to the distance (far/near) from the light source.

* * * * *